(12) United States Patent
Chan et al.

(10) Patent No.: US 9,848,213 B2
(45) Date of Patent: Dec. 19, 2017

(54) LINEAR PROGRAMMING BASED DISTRIBUTED MULTIMEDIA STORAGE AND RETRIEVAL

(71) Applicant: The Hong Kong University of Science and Technology, Hong Kong (CN)

(72) Inventors: Shueng Han Gary Chan, Kowloon (HK); Zhuolin Xu, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 143 days.

(21) Appl. No.: 14/010,940

(22) Filed: Aug. 27, 2013

(65) Prior Publication Data

US 2014/0082679 A1   Mar. 20, 2014

Related U.S. Application Data

(60) Provisional application No. 61/744,171, filed on Sep. 20, 2012.

(51) Int. Cl.
| | |
|---|---|
| H04N 7/173 | (2011.01) |
| H04N 21/218 | (2011.01) |
| H04N 21/231 | (2011.01) |
| H04N 21/232 | (2011.01) |
| H04N 21/84 | (2011.01) |
| H04N 21/845 | (2011.01) |

(52) U.S. Cl.
CPC ....... *H04N 21/2181* (2013.01); *H04N 21/231* (2013.01); *H04N 21/232* (2013.01); *H04N 21/84* (2013.01); *H04N 21/8456* (2013.01)

(58) Field of Classification Search
None
See application file for complete search history.

(56) References Cited

U.S. PATENT DOCUMENTS 6,029,195 A * 2/2000 Herz ................. G06F 17/30867
                                                      348/E7.056
6,167,496 A   12/2000 Fechner
(Continued)

OTHER PUBLICATIONS

Coughlin, "Digital storage for professional media and entertainment," 2009, 42 pages.
(Continued)

*Primary Examiner* — Jason K Lin
(74) *Attorney, Agent, or Firm* — Amin, Turocy & Watson, LLP

(57) ABSTRACT

Video on demand is orchestrated between systems by linear program (LP) based multimedia storage and retrieval. An LP based storage and retrieval system can partition multimedia data into an integral number of segments. Further, the LP based storage and retrieval system can store a first amount of the integral number of segments in a storage device of storage devices of a storage network in response to a determination that a storage size of the storage device satisfies a first condition with respect to the first amount of the integral number of segments. Furthermore, such system can store a segment of a second amount of the integral number of segments in a remote storage device of the remote storage devices in response to a determination that the segment satisfies a second condition with respect to a defined number of remote storage devices of the storage devices that have stored the segment.

25 Claims, 24 Drawing Sheets

(56) References Cited

U.S. PATENT DOCUMENTS

| | | | |
|---|---|---|---|
| 6,868,452 B1* | 3/2005 | Eager | H04N 21/23106 709/231 |
| 7,039,784 B1* | 5/2006 | Chen et al. | 711/170 |
| 8,925,022 B2* | 12/2014 | Carbunar | H04N 21/2225 725/86 |
| 9,113,182 B2* | 8/2015 | Lemmons | H04N 21/2543 |
| 9,307,044 B2* | 4/2016 | Karasaridis | H04L 67/2847 |
| 2002/0152318 A1* | 10/2002 | Menon et al. | 709/231 |
| 2007/0002839 A1 | 1/2007 | Collet et al. | |
| 2008/0071894 A1 | 3/2008 | Luss et al. | |
| 2009/0180480 A1* | 7/2009 | Hilt | H04L 45/00 370/395.21 |
| 2010/0011103 A1* | 1/2010 | Luzzatti et al. | 709/226 |
| 2010/0121940 A1* | 5/2010 | Reeser | 709/219 |
| 2010/0235432 A1* | 9/2010 | Trojer | 709/203 |
| 2010/0241757 A1* | 9/2010 | Hu et al. | 709/231 |
| 2010/0332549 A1* | 12/2010 | Nichols | G06F 17/30067 707/802 |
| 2012/0005251 A1* | 1/2012 | Xie | H04L 67/288 709/201 |
| 2012/0023530 A1 | 1/2012 | Xia et al. | |
| 2012/0159558 A1 | 6/2012 | Whyte et al. | |
| 2013/0007263 A1* | 1/2013 | Soroushian | H04L 47/12 709/224 |
| 2013/0166625 A1* | 6/2013 | Swaminathan et al. | 709/203 |
| 2013/0232179 A1* | 9/2013 | Chhaunker | G06F 17/3007 707/827 |
| 2014/0067898 A1* | 3/2014 | Steiner | H04N 21/222 709/201 |
| 2015/0189343 A1* | 7/2015 | Lee | H04N 21/25435 725/1 |

OTHER PUBLICATIONS

Cisco, "Cisco visual networking index: Forecast and methodology, 2010-2015," 2011, 16 pages.

Alam, et al. "Heuristic solution of MMKP in different distributed admission control and QoS adaptation architectures for video on demand service", 2005, 8 pages.

Chang, et al. "Reducing the overhead of view-upload decoupling in peer-to-peer video on-demand systems", 2011, 5 pages.

Nimkar, et al. "Video placement and disk load balancing algorithm for VoD proxy server", 2009, 6 pages.

Borst, et al. "Distributed caching algorithms for content distribution networks", 2010, 9 pages.

Zaman, et al. "A distributed algorithm for the replica placement problem", 2011, 14 pages.

Kangasharju, et al. "Optimizing file availability in peer-to-peer content distribution", May 2007, 9 pages.

Annapureddy, et al. "Is high-quality VoD feasible using P2P swarming", 2007, 9 pages.

Annapureddy, et al. "Providing video-on-demand using peer-to-peer networks", 2005, 14 pages.

Hefeeda, et al. "On the benefits of cooperative proxy caching for peer-to-peer traffic", Jul. 2010, 12 pages.

Dai, et al. "Collaborative hierarchical caching with dynamic request routing for massive content distribution", Mar. 2012, 9 pages.

Yiu, et al. "VMesh: Distributed segment storage for peer-to-peer interactive video streaming", Dec. 2007, 15 pages.

He, et al. "Optimal prefetching scheme in P2P VoD applications with guided seeks", Jan. 2009, 14 pages.

Wu, et al. "Exploring the optimal replication strategy in P2P-VoD systems: Characterization and evaluation", 2011, 9 pages.

Choe, et al. "Improving VoD server efficiency with bittorrent", 2007, 10 pages.

Dana, et al. "BASS: Bittorrent assisted streaming system for video-on-demand", Nov. 2006, 4 pages.

Cheng, et al. "LiveBT: Providing video-on-demand streaming service over bittorrent systems", 2007, 8 pages.

Vinay, et al. "Bandwidth aware load balancing and optimal bandwidth allocation techniques for video-on-demand systems", Oct. 2010, 8 pages.

Huang, et al. "Can Internet video-on-demand be profitable?", 2007, 12 pages.

Li, et al. "Cost-effective partial migration of VoD services to content clouds", Jul. 2011, 8 pages.

Zhou, et al. "A unifying model and analysis of P2P VoD replication and scheduling", Mar. 2012, 9 pages.

Wu, et al. "Exploring the optimal replication strategy in P2P-VoD systems: Characterization and evaluation", Apr. 2011, 9 pages.

Zhou, et al. "On replication algorithm in P2P VoD", Feb. 2013, 11 pages.

Xu, et al. "LP-based optimization of storage and retrieval for distributed video-on-demand", Dec. 2012, 6 pages.

Grant, et al. "CVX: Matlab software for disciplined convex programming, version 1.21", Jan. 2011.

Sturm, "Primal-dual interior point approach to semidefinite programming", 1998.

Applegate, et al. "Optimal Content Placement for a Large-scale VoD System", 2010, 12 pages.

Chan, "Operation and Cost Optimization of a Distributed Servers Architecture for On-Demand Video Services", 2001, 3 pages.

Chan, et al. "Distributed Servers Architecture for Networked Video Services", 2001, 12 pages.

Klienrock, "Queueing Systems, vol. 1: Theory", 1976, 426 pages.

Mehyar, et al. "Asynchronous Distributed Averaging on Communication Networks", 2007, 10 pages.

Lv, et al. "LiveBT: Providing Video-on-Demand Streaming Service over BitTorrent Systems", 2007, 8 pages.

Niu, et al. "Demand Forecast and Performance Prediction in Peer-Assisted On-Demand Streaming Systems", 2011, 5 pages.

* cited by examiner

LINEAR PROGRAMMING BASED DISTRIBUTED MULTIMEDIA STORAGE AND RETRIEVAL

PRIORITY CLAIM

This application claims priority to U.S. Provisional Patent Application No. 61/744,171, filed on Sep. 20, 2012, entitled "A METHOD TO OPTIMIZE MOVIE STORAGE AND RETRIEVAL FOR DISTRIBUTED VIDEO-ON-DEMAND", the entirety of which is incorporated by reference herein.

TECHNICAL FIELD

This disclosure relates generally to multimedia storage and retrieval, but not limited to, linear programming based distributed multimedia storage and retrieval.

BACKGROUND

In order to provide cost-effective video-on-demand (VoD) streaming services scalable to a large number of users, a content provider often deploys distributed servers placed close to user pools of a network. These servers cooperatively replicate and retrieve movies to reduce network load and scale up streaming and storage capacity of the network. However, such convential VoD streaming technologies do not adequeately address system deployment costs associated with server bandwidth, server storage, and network traffic among servers.

The above-described deficiencies of today's multimedia storage and retrieval environments and related technologies are merely intended to provide an overview of some of the problems of conventional technology, and are not intended to be exhaustive, representative, or always applicable. Other problems with the state of the art, and corresponding benefits of some of the various non-limiting embodiments described herein, may become further apparent upon review of the following detailed description.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative non-limiting embodiments in a simplified form as a prelude to the more detailed description of the various embodiments that follow. It will also be appreciated that the detailed description may include additional or alternative embodiments beyond those described in this summary.

In accordance with one or more embodiments and corresponding disclosure, various non-limiting aspects are described in connection with linear programming (LP) based distributed multimedia storage and retrieval.

In one or more embodiments, an LP based storage and retrieval system can include an LP storage component, a segment storage and placement component, and an LP retrieval component. In an embodiment, the LP based storage and retrieval system can receive movie, server, and network cost parameters, and based on such parameters, can facilitate optimal movie segment storage and retrieval utilizing linear programming.

In an aspect, the LP storage component can partition multimedia data, e.g., including a movie, video content, audio content, etc. into an integral number, e.g., integral data type, integer, etc. of segments. Further, the segment storage and placement component can store a portion of the integral number of segments in a storage device, e.g., server, local proxy server, central proxy server, remote proxy service, etc. of storage devices of a storage network, e.g., a cloud-based network, etc. in response to a determination that a storage size of the storage device satisfies a condition with respect to the portion of the integral number of segments. For example, the segment storage and placement component can store the portion of the integral number of segments in the storage device in response to a determination that the storage size is greater than or equal to a size of the portion of the integral number of segments. In another example, the condition can be associated with a bandwidth of the storage device with respect to transfer of portion(s) of the integral number of segments from the storage device to another storage device, e.g., a remote proxy server, etc. of the storage devices.

In another aspect, the segment storage and placement component can store a segment of another portion of the integral number of segments in a remote storage device of remote storage devices in response to a determination that the segment satisfies another condition with respect to a defined number of the remote storage devices of the storage devices that have stored the segment. For example, the other condition represents the segment has been least stored among the defined number of the remote storage devices with respect to remaining segments of the other portion of the integral number of segments that have been stored among the defined number of remote storage devices.

In yet another aspect, the LP retrieval component can initiate a retrieval, e.g., by the storage device, of the segment from the remote storage device to the storage device in response to a determination that a probability of a transfer of the segment from the remote storage device to the storage device satisfies a bandwidth condition with respect to a defined transmission bandwidth between the storage device and the remote storage device.

In one non-limiting implementation, a method can include dividing, by a system comprising a processor, multimedia data into an integral number of segments. Further, the method can include storing a first portion of the integral number of segments in a first storage device, e.g., local proxy server, etc. in response to determining that the first storage device satisfies a segment storage condition with respect to storage of the first portion of the integral number of segments. Furthermore, the method can include assigning storage of a segment of a second portion of the integral number of segments to a second storage device, e.g., remote proxy server, etc. of the storage devices in response to determining that the segment satisfies a segment placement condition with respect to a defined number of times the segment has been stored in storage devices, e.g., remote proxy servers, etc. distinct from the first storage device.

Another non-limiting limitation can include a video on demand storage system, comprising: a memory to store instructions; and a processor, coupled to the memory, that executes or facilitates execution of the instructions to perform operations, comprising: dividing movies into an integral number of storage segments. Further, the operations can include storing a first portion of the integral number of storage segments in a first storage device, e.g., local proxy server, etc. in response to determining that the first storage device satisfies a first condition with respect to a size of the first storage device. Furthermore, the operations can include storing a storage segment of a second portion of the integral number of storage segments in a second storage device, e.g., remote proxy server, etc. of the storage devices in response to determining that the storage segment satisfies a second condition with respect to a defined number of copies of the storage segment that have been stored in storage devices distinct from the first storage device.

Yet another non-limiting limitation can include a computer-readable storage device comprising computer executable instructions that, in response to execution, cause a system comprising a processor to perform operations. Further, the operations can include partitioning multimedia data into an integral number of storage segments; in response to determining that a storage size of a local proxy server device of a cloud based network environment satisfies a first condition with respect to a first amount of the integral number of storage segments, storing the first amount in the local proxy server device; and in response to determining that a storage segment of a second amount of the integral number of storage segments, distinct from the first amount, satisfies a second condition with respect to a defined number of remote proxy server devices that have stored the storage segment, storing the storage segment in a remote proxy server device of the remote proxy server devices.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Figure 1:
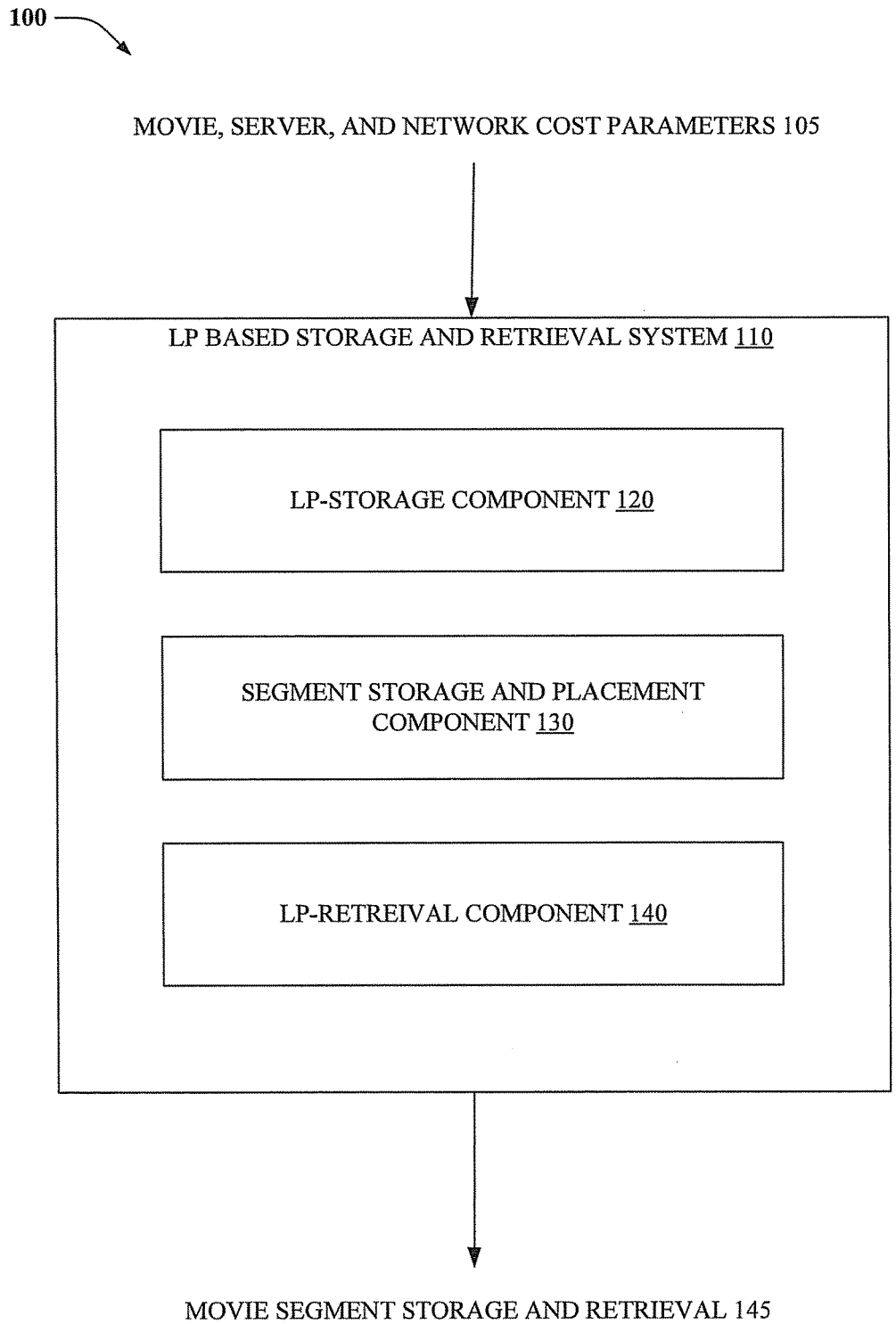
FIG. 1 illustrates a block diagram of a linear programming (LP) based storage and retrieval infrastructure, in accordance with various embodiments.

Various non-limiting embodiments of systems, methods, and apparatus presented herein provide for linear programming based distributed multimedia storage and retrieval. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, a cloud based infrastructure, a cloud based computing system, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to partition multimedia data into an integral number of segments, and store a portion of the integral number of segments in a storage device in response to a determination that a storage size of the storage device satisfies a condition with respect to the portion of the integral number of segments.

Further, the artificial intelligence system can store a segment of another portion of the integral number of segments in a remote storage device of remote storage devices in response to a determination that the segment satisfies another condition with respect to a defined number of the remote storage devices of the storage devices that have stored the segment.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; and/or flash memory device (e.g., card, stick, key drive).

I. Minimizing Deployment Cost

In this section, minimization of deployment cost for distributed multimedia storage and retrieval is described. Table 1 below describes related symbols.

TABLE 1

Major symbols

| Notation | Definition |
|---|---|
| G(V, E) | A undirected graph representing the overlay network topology |
| V | The set of servers (repository and distributed proxy servers) |
| |V| | The number of servers |
| M | The set of movies |
| |M| | The number of movies |
| $L^{(m)}$ | The movie length (in seconds) |
| $p^{(m)}$ | Access probability of movie m |
| $I_v^{(m)}$ | 0 or 1 variable indicating whether server v stores movie m |
| $B_v$ | Storage space of server v (in seconds) |
| $r_{uv}^{(m)}$ | The probability of streaming movie m from server u to server v |
| $\lambda_v$ | Request arrival rate at server v (requests per second) |
| $\alpha_m L^{(m)}$ | Average holding (viewing) time of movie m $\alpha^{(m)} \geq 0$ |
| $\Gamma_{uv}$ | Network transmission bandwidth from server u to v (bits/s) |
| b | Movie streaming rate (bits/s) |
| $R_v$ | Total uploading bandwidth of server v (bits/s) |
| $C_v^s$ | Cost of server v (per second) |
| $C^s$ | Aggregated server cost (per second) |
| $C_{uv}^N$ | Network cost due to directed traffic flow from two servers u and v (per second) |
| $C^N$ | Total network cost (per second) |
| C | Total deployment cost (=$C^s + C^N$) |

The overlay network is modeled as an undirected graph G=(V,E), where V is the set of servers and repository and E=V×V is the set of overlay edges connecting nodes in V (the extension to directed graph is straightforward given our current formulation). Let M be the set of movies and $L^{(m)}$ be the movie length (in seconds). Let $p^{(m)}$ be the popularity of movie m, which is the probability that a user requests movie m, where $0 \leq p^{(m)} \leq 1$ and $\Sigma_{m \in M} p^{(m)} = 1$.

A server v has a certain storage space $B_v$ (in seconds). Let $$I_v^{(m)} \in \{0,1\}, \forall v \in V, m \in M, \qquad (1)$$

indicate whether server v stores movie m. Note that for the repository, $I_v^{(m)} = 1$, $\forall m \in M$. We obviously must have $$\sum_{m \in M} I_v^{(m)} L^{(m)} \leq B_v, \forall v \in V. \qquad (2)$$

Let $$0 \leq r_{uv}^{(m)} \leq 1, \forall u, v \in V, m \in M, \qquad (3)$$

be the probability of supplying movie m from server u to server v.

As the server cannot supply more than that it stores, we must have $$r_{uv}^{(m)} \leq I_u^{(m)}, \forall u, v \in V, m \in M. \qquad (4)$$

In other words, when there is a miss, a remote server can only supply the movie it locally stores. And by definition, $r_{vv}^{(m)} = I_v^{(m)}$.

Each user retrieves data from the servers (including his home server), we hence must have $$\sum_{u \in V} r_{uv}^{(m)} = 1, \forall v \in V, m \in M. \qquad (5)$$

Let $\lambda_v$ be the total movie request rate at server v (requests per second); the request rate for movie m at server v is hence $p^{(m)} \lambda_v$.

Further let $\alpha^{(m)} L^{(m)}$ be the average holding (or viewing) time for movie m, where $\alpha^{(m)} \geq 0$. Note that we have considered user interactivity on movie segments through $\alpha^{(m)}$, which may be different for different movies (interesting movies may have $\alpha^{(m)}>1$, or vice versa). Furthermore, we are interested in average holding time, as we are considering time-averaged cost at steady state (hence the distribution of the holding time may be different for different movies). While interacting with the movie, a user holds up a stream and may uniformly visit any segments of the movie over time. Given the above, the average amount of data streamed from server u to v for movie m is hence $r_{uv}^{(m)}\alpha^{(m)}L^{(m)}$.

Let b be the movie streaming bitrate (bits/s). Hence, the data rate the server v "pulls" from server u for movie m is $p^{(m)}\lambda_v\alpha^{(m)}r_{uv}^{(m)}L^{(m)}b$. Therefore, the total network transmission bandwidth (bits/s) from server u to v is $$\Gamma_{uv} = \sum_{m \in M} p^{(m)}\lambda_v\alpha^{(m)}r_{uv}^{(m)}L^{(m)}b, \forall u, v \in V, \quad (6)$$

for $u \neq v$, and, by definition, $\Gamma_{uu}=0$.

We consider a general network cost model for the traffic between servers serving the misses. Let $C_{uv}^N$ be a monotonically non-decreasing piece-wise linear function of network cost due to the directed traffic flow from server u to v, i.e., $$C_{uv}^N = \mathbb{C}_{uv}^N(\Gamma_{uv}), \forall u, v \in V, \quad (7)$$

with $C_{uu}^N=0$. Note that our model is general as $C_{uv}^N$ does not have to be the same as $C_{vu}^N$. The total network cost $C^N$ is hence $$C^N = \sum_{u,v \in V} C_{uv}^N. \quad (8)$$

The bandwidth used in a server to serve the other remote servers depends on where to store and how to retrieve a movie. For any server $v \in V$, the total uploading rate (bits/s) that it serves other servers is given by $$R_v = \sum_{u \in V, u \neq v} \Gamma_{vu}, \forall v \in V. \quad (9)$$

The servers help each other using "cache and stream" model, i.e., a remote server streams to a user through his home server. Therefore, the total bandwidth of server v to serve its local users is given by $\sum_{m \in M} p^{(m)}\lambda_v\alpha^{(m)}L^{(m)}b$. This is a fixed quantity given local traffic, and hence will not be considered in our cost optimization.

While network cost depends on the traffic between pairs of servers, the cost of a server depends on its total storage and uploading rate used (in order to serve the other servers in the network). Such storage and rate are limited by its disk capacities independent of other servers. Let $C_v^S$ be the cost of operating the server v, which is a monotonically non-decreasing piece-wise linear function in $B_v$ (storage) and $R_v$ (uploading bandwidth), i.e., $$C_v^S = \mathbb{C}_v^S(B_v, R_v), \forall v \in V. \quad (10)$$

In another words, the server cost is a function of its storage and streaming bandwidth. The aggregated server cost $C^S$ is hence $$C^S = \sum_{v \in V} C_v^S. \quad (11)$$

Therefore, the total system deployment cost C is $$C = C^N + C^S. \quad (12)$$

We state our joint cost-optimization problem as follows:

JOSR: Joint Optimization on Movie Storage and Retrieval Problem to Minimize Deployment Cost: Given topology G, user demand $\{\lambda_v\}$, storage capacity $\{B_v\}$, movie popularity $\{p^{(m)}\}$, and cost functions $\{\mathbb{C}_{uv}^N\}$ and $\{\mathbb{C}_v^S\}$, we seek to minimize the total cost given by Equation (12), subject to Equation (1) to Equation (5). The output is movie storage in each server (i.e., $\{I_v^{(m)}\}$) and movie retrieval between servers (i.e., $\{r_{uv}^{(m)}\}$).

Claim: The JOSR problem is NP-hard.

Proof: We prove its NP-hardness by deriving a polynomial reduction from the Domatic Number Problem, whose NP-complete version is stated as follows. Given G=(V, E) and a positive integer K no larger than |V|, is the domatic number of G at least K, i.e., can V be partitioned into at least K disjoint dominating sets?

Given G and K, we construct an instance of our decision problem as follows. The network contains K equal-sized movies with equal popularity everywhere, with each server being able to store only one movie. Consider the case that movie length is homogeneous, average viewing time of a movie is the entire movie, request demand at each server is D/|V|, unit storage cost is zero and unit access cost of "pulling" a movie from a remote server (including the streaming cost of the remote server and the network cost from remote to the home server) is i units ($i \in Z^+$). Note that such instance construction can obviously be done in polynomial time. Our decision problem hence becomes: Given the instance, is there a joint SR strategy which achieves total cost of at most $D \times (K-1)/K$?

Clearly, at each node v, the minimum average access cost is $(K-1)/K$ when one movie is stored locally and $(K-1)$ movies are in the remote servers with 1-unit access cost, and the total cost collected from all the nodes is correspondingly $D \times (K-1)/K$. As the overlay VoD network in consideration is a connected graph, we construct its subgraph G' which maintains all the servers (i.e. nodes) and the edges with 1-unit access cost. This can also be done in polynomial time. We show that G' can be partitioned into K disjoint dominating sets if and only if there is such a strategy.

First, if there is such a strategy, any node v can access a movie within 1-unit access cost. Then if we could separate V into K disjoint sets with each corresponding to a certain movie, it would result in K dominating sets because the distance between a set and any node is either zero (i.e., contained in the set) or one unit (i.e., connected by an edge). Furthermore, if we have K disjoint dominating sets, we can easily derive such a strategy by assigning each set a distinct movie to store. Therefore, we reduce the Domatic Number Problem to our decision problem which proves that our optimization problem is NP-hard.

II. LP-SR: LP-Based Segment Storage and Retrieval

In this section, a heuristic called linear program-storage and retrieval (LP-SR), which decomposes the optimization problem into two linear programs (LPs) for linear program segment storage (LP-S) and linear program segment retrieval (LP-R), is described. LP-SR works as follows: we first relax the problem stated above to an LP which yields optimal movie storage. Based on the LP solution, we then discretize segment storage. Our discretization process for segment storage is shown to be asymptotically optimal. Given the storage, we solve the optimal segment retrieval problem by another LP.

II.A LP-S: Relaxation to a Linear Program for Movie Storage

In order to address the NP-hard problem, we relax the constraint in Equation (1) as $$0 \leq I_v^{(m)} \leq 1, \forall v \in V, m \in M. \quad (13)$$

After such relaxations, it is clear that our problem contains only linear constraints of real numbers. Therefore, it becomes an LP, and its solution $I_v^{(m)}$ refers to the fraction of movie m that server v stores.

Note that for any arbitrary linear functions of $C_{uv}^N$ (Equation (10)) and $C_v^S$ (Equation (7)) the relaxed problem becomes a linear programming (LP) problem that can be solved efficiently.

II.B Asymptotically Optimal Segment Storage and Placement

The LP solution above leads to optimal fraction of movies stored in each server (and hence called LP-S). For ease of replication and access, in reality each movie is partitioned into integral parts of k segments (k≥1). The major issue is then how to discretize the LP-S solution to obtain the number of and which movie segments to store in each server.

We present here an asymptotically optimal segment storage algorithm, i.e., as k increases, our algorithm approaches the JOSR exact solution (we show later in our simulation that k does not need to be large to achieve closely optimum). In order to do that, we place some of the k segments of a movie so as to match as closely as possible the optimal movie storage $I_v^{(m)}$ obtained from LP-S. The major issues are then how many segments of a movie should be stored (i.e. segment space allocation) and which of these segments should be stored (i.e. segment placement) at each server.

II.B.1. Segment Space Allocation

Based on LP-S solution, the optimal number of segments of movie m that server v should store is $$n_v^{(m)} = I_v^{(m)} k, \forall v \in V, m \in M. \quad (14)$$

For integral and finite k, $\{n_v^{(m)}\}$ needs to be discretized to integral values. We present below a simple discretization approach where each server tries to match the optimal LP-S solution as much as possible through integer rounding.

We first round down the result $\{n_v^{(m)}\}$ as obtained in Equation (14) to its closest integers $\{\lfloor n_v^{(m)} \rfloor\}$. For server v, it first allocates $\lfloor n_v^{(m)} \rfloor$ segment space according to these integers for movie m. This clearly does not violate its storage constraint (given in Equation (2)).

Note that after the above process, the "unmatched" portion (in minutes) of movie m is given by $$(n_v^{(m)} - \lfloor n_v^{(m)} \rfloor) \frac{L^{(m)}}{k}. \quad (15)$$

For the residual storage server v then allocates space in decreasing order of the unmatched portion until until its total storage is exhausted.

It is clear from above that, with our discretization process, we can come arbitrarily close to the exact optimality of JOSR solution by increasing k, i.e., asymptotically approaches the optimal solution. This is because the rounding effect diminishes with k.

II.B.2 Segment Placement

It is clear that after the above segment space allocation, each server stores integral number of movie segments. Each server then needs to place some of k segments to store. The guiding principle of our placement algorithm is that all the segments of a movie should has similar number of replicates in the whole network. Accordingly, we use rarest first in segment placement. Specifically, when a server makes a segment placement for a movie, it selects the segment which is the least globally stored until the space budget of the movie is fully consumed.

Figure 2:
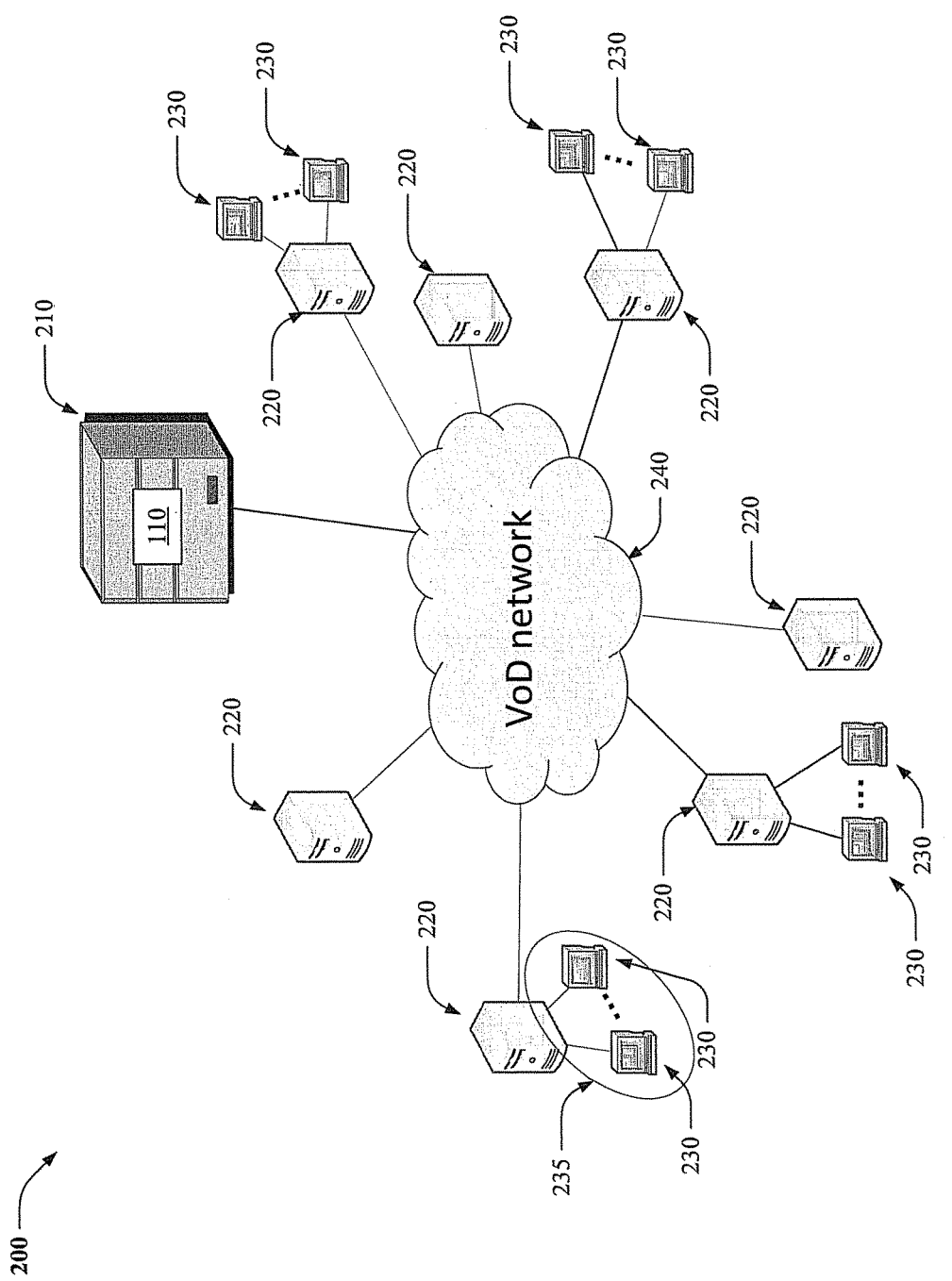
FIG. 2 illustrates a block diagram of another LP based storage and retrieval infrastructure, in accordance with various embodiments.
Figure 3:
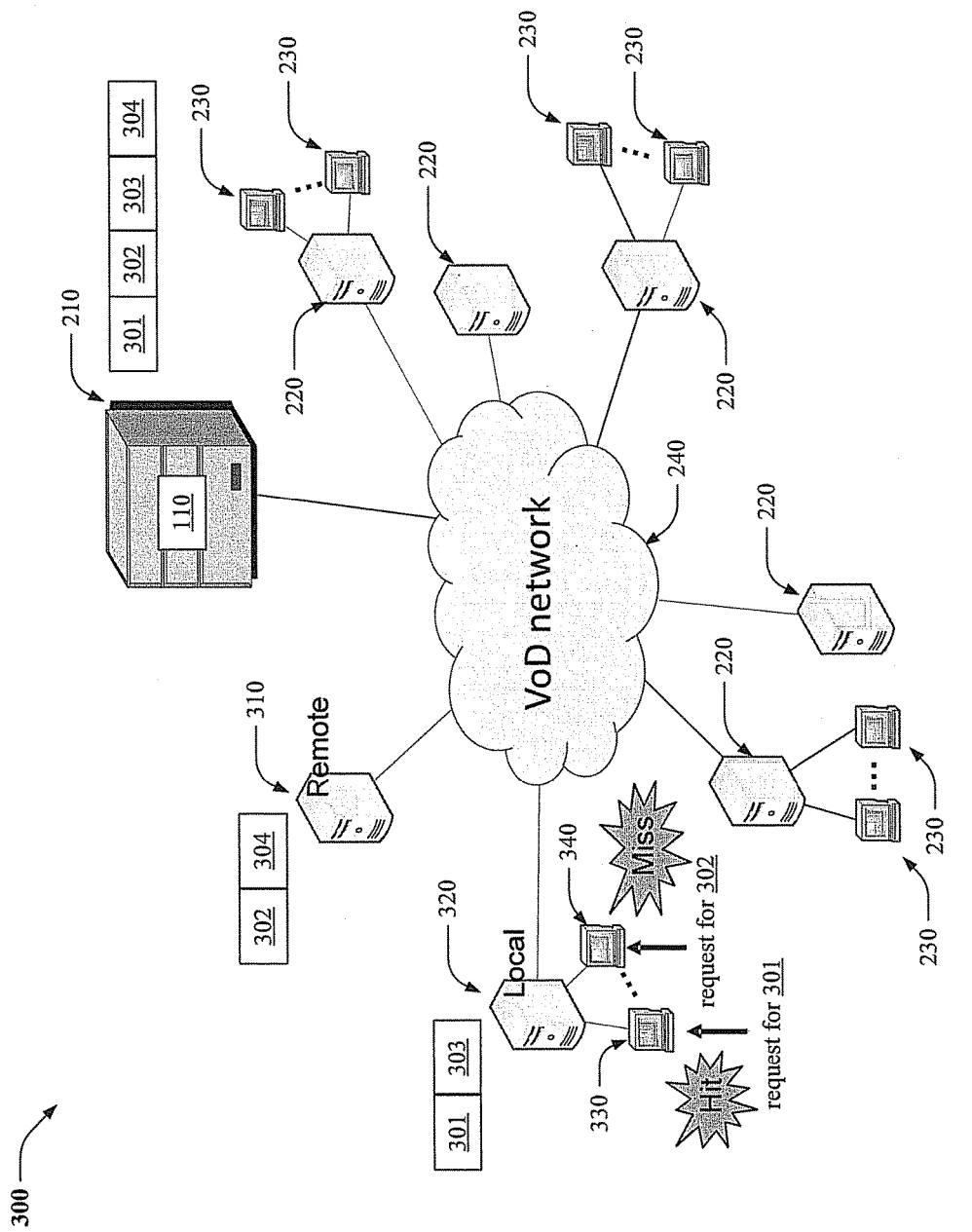
FIG. 3 illustrates a block diagram of yet another LP based storage and retrieval infrastructure, in accordance with various embodiments.

Referring now to FIGS. 1-3, and referencing Equation (13) to Equation (15), block diagrams of LP based storage and retrieval infrastructures 100, 200, and 300, respectively, are illustrated, in accordance with various embodiments. Aspects of LP based storage and retrieval infrastructures 100, 200, and 300, and systems, networks, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As illustrated by FIG. 2, LP based storage and retrieval infrastructure 200 includes a central server 210, or repository, which can store all movies, video, content, etc. of a storage network, e.g., VoD network 240, a cloud-based network, etc. Further, proxy servers 220, e.g., local proxy servers, remote proxy servers, etc. can be placed, communicatively coupled to, etc. near user, client, etc. pools, e.g., 235, which include user, client, etc. devices 230 that submit requests, VoD requests, etc. for multimedia content, e.g., video content, audio content, movies, etc. To minimize interactive delay associated with the VoD requests, movie segments are streamed to devices 230, i.e., they are not downloaded to devices 230 before being played back. As such, while central server 210 stores all the movies, proxy servers 220 can include heterogeneous storage that can replicate a fraction of the movies for streaming to devices 230 in response to receiving VoD requests. Each user, client, etc. has a home (or local) server, e.g., proxy server 220, local proxy server, etc. to serve such requests.

Central server 210 can include LP based storage and retrieval system 110. As illustrated by FIG. 1, LP based storage and retrieval system 110 can receive information associated with movie, server, and network cost parameters 105, and can facilitate optimal movie segment storage and retrieval 145 utilizing such information. Further, LP based storage and retrieval system 110 can include LP-storage component 120, segment storage and placement component 130, and LP-retrieval component 140. Furthermore, as illustrated by FIG. 3, LP storage component 120 can partition multimedia data, e.g., including a movie, video content, audio content, etc. into an integral number, e.g., integral data type, integer, etc. of segments, e.g., 301, 302, 303, and 304. Further, LP storage component 120 can store the segments in central server 210, which can store all movies of VoD network 240. Furthermore, segment storage and placement component 130 can store a portion of the integral number of segments, e.g., 301 and 303, 302 and 304, etc. as replicates in a storage device, e.g., local proxy server 320 and remote proxy server 310, respectively, in response to a determination that a storage size of the storage device satisfies a condition with respect to the portion of the integral number of segments.

In one embodiment, segment storage and placement component 130 can store the portion of the integral number of segments in the storage device in response to a determination that the storage size is greater than or equal to a size of the portion of the integral number of segments. In another example, the condition can be associated with a bandwidth of the storage device with respect to transfer of portion(s) of the integral number of segments from the storage device to another storage device, e.g., the condition can be associated with an available data transfer rate between remote proxy server 310 and local proxy server 320.

In yet another embodiment, segment storage and placement component 130 can store a segment of another portion of the integral number of segments in a remote storage device of remote storage devices, e.g., remote proxy server 310, in response to a determination that the segment satisfies another condition with respect to a defined number of the remote storage devices of the storage devices that have stored the segment. For example, the other condition represents the segment has been least stored among the defined number of the remote storage devices with respect to remaining segments of the other portion of the integral number of segments that have been stored among the defined number of remote storage devices.

II.C LP-R: Optimal Segment Retrieval as a Linear Program

The optimal solution of $\{r_{uv}^{(m)}\}$ given by LP-S is no longer appropriate due to our segment storage. We hence need to formulate another LP (called LP-R) to derive optimal segment retrieval given segment storage above. The major variables used for segment retrieval are shown in Table 2.

TABLE 2

Symbols for segment retrieval.

| Notation | Definition |
| --- | --- |
| $I_v^{(ms)}$ | 0 or 1 variable indicating whether server v stores segment s of movie m |
| $r_{uv}^{(ms)}$ | The probability of streaming segment s of movie m from server u to server v. |
| S | The set of segment indices of a movie, i.e. $\{1, 2, \ldots, k\}$ |
| $\lambda_v'$ | Request rate of segments at server v (req./sec.) |
| $p^{(ms)}$ | Access probability of segment s of movie m |
| $L^{(ms)}$ | Length of segment s of movie m (seconds) |

Let $S=\{1, 2, \ldots, k\}$ be the set of segment indices of any movie. Let $I_v^{(ms)} \in \{0,1\}$ indicate whether server v stores segment s of movie m, which has been derived given the discussion presented in this section above. We further let $r_{uv}^{(ms)}$ be the probability of requesting server u from server v segment s of movie m. The segment retrieval problem can then be stated as follows:

Arrival rate: A request for a movie leads to streaming of all its k segments. Therefore, the request rate for segments at server v, given movie request rate $\lambda_v$, is $$\lambda_v' = k\lambda_v, \forall v \in V. \tag{16}$$

Length: A movie is equally divided into k segments; hence we have $$L^{(ms)} = \frac{L^{(m)}}{k}, \forall m \in M, s \in S. \tag{17}$$

Popularity: The popularity of the segments of the same movie is given by $$p^{(ms)} = \frac{p^{(m)}}{k}, \forall m \in M, s \in S. \tag{18}$$

Using the above, we can formulate optimal segment retrieval problem as a linear program (LP-R), i.e.

$$\min\left(\sum_{u,v \in V} C_{uv}^N(\Gamma_{uv}) + \sum_{v \in V} C_v^S(B_v, R_v)\right), \tag{19}$$

subject to $$0 \le r_{uv}^{(ms)} \le I_v^{(ms)}, \forall u, v \in V, m \in M, s \in S,$$

$$\sum_{u \in V} r_{uv}^{(ms)} = 1, \forall v \in V, m \in M, s \in S.$$

Now referring to FIG. 3, and referencing Equation (19), LP retrieval component 140 can initiate a retrieval of the segment, e.g., by local proxy server 320, from the remote storage device, e.g., remote proxy server 310, to the storage device, e.g., local proxy server 320, in response to a determination that a probability of a transfer of the segment from the remote storage device to the storage device satisfies a bandwidth condition with respect to a defined transmission bandwidth between the storage device and the remote storage device. In an embodiment, the defined transmission bandwidth can based on a probability that device 230 requests access of the multimedia content, a rate of segment requests that have been received by local proxy server 320, and/or an average amount of multimedia content that has been streamed from remote proxy server 310 to the local proxy server 320.

For example, if a request for multimedia content 301 received by local proxy server 320, from device 230, is a hit, localy proxy server 320 can directly stream multimedia content to device 230. However, if the request is a miss, local proxy server 320 can be instructed, initiated, etc. by LP retrieval component 140 to pull, based on the bandwidth condition, the content from remote proxy server 310, central server 210, etc. to stream the request. As such, the bandwidth of remote proxy server 310 can be used to stream not only multimedia content of home users, devices 230, etc. (if any) associated with remote proxy server 310, but also remote servers, e.g., local proxy server 320, requesting content stored in the remote proxy server 310.

Figure 4:
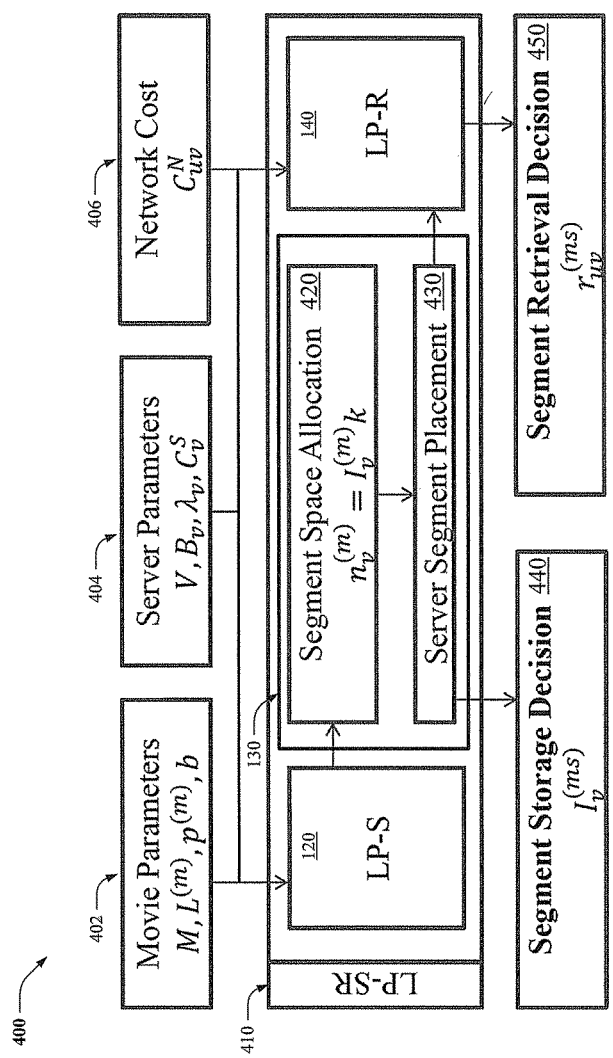
FIG. 4 illustrates a block diagram of an LP based storage and retrieval system, in accordance with various embodiments.

FIG. 4 illustrates a block diagram 400 of an LP based storage and retrieval system 410, in accordance with various embodiments. LP based storage and retrieval system 410 can receive movie parameters 402 including a set of movies, respective lengths of the movies, a probability of accessing a movie of the movies, and a streaming rate of the movie.

Further, LP based storage and retrieval system 410 can receive server parameters 404 including a set of servers, e.g., including central server 210 and distributed proxy servers 220, e.g., local proxy servers, remote proxy servers, etc. Furthermore, server parameters 404 can include storage space of a server of the set of servers, a request arrival rate at the server, and a cost of the server, e.g., regarding storage cost and bandwidth utilization of the server. Further, LP based storage and retrieval system 410 can receive network cost parameters 406 including a network cost due to directed traffic flow between servers, e.g., associated with access bandwidth consumed between the servers.

Based on movie parameters 402, server parameters 404, and network cost parameters 406, and with respect to the analysis presented above regarding Equations (1) to (19), segment space allocation component 420 can receive, from LP storage component 120, information referencing a fraction of a movie that a server, e.g., local proxy server 320, remote proxy server 310, etc. can store. As such, regarding segment storage decision 440, segment space allocation component 420 can allocate, store, etc. via discretization, space for a first portion of segments of the movie, e.g., in local proxy server 320. Further, server segment placement component 430 can store, place, etc. a second portion of the segments, utilizing the information, in remote proxy server 310.

Based on the storage, placement, etc. performed by segment placement component 430, LP retrieval component 140 can initiate, via segment retrieval decision 450, via local proxy server 320, etc. a retrieval of the second portion of the segments from remote proxy server 310, e.g., to the local proxy server 320.

II.D Run-Time Complexity of LP-SR

To solve LP-S and LP-R, general software for convex programming, e.g., CVX, can be used, which implements the wide-region centering-predictor-corrector algorithm (an interior-point method). It has been proven that it has $O(\sqrt{N})$ worst-case iteration bound and $O(N^3)$ overall time complexity, where N is the number of variables.

Note that LP-S and LP-R has $O(|V|^2|M|)$ and $O(|V|^2|M|k)$ variables, respectively. Therefore, the time complexity of the two LPs is $O(|V|^6|M|^3)$ and $O(|V|^6|M|^3k^3)$, respectively. Furthermore, the time complexity of segment storage is $O(|V||M|k)$, because all the servers, movies and their constituent segments are traversed to determine which server to store which segment.

Given the above, the overall time complexity of LP-SR is $O(|V|^6|M|^3k^3)$. Note that even though the run-time complexity of LP-SR is related to k, low k (say 5) already achieves closely optimal solution.

II.E Efficient Computation for Large Movie Pool

Referencing the above discussion regarding run-time complexity of LP-SR, the LP-SR run-time complexity of a number of movies |M| is $O(|M|^3)$. Accordingly, we propose an efficient computation based on movie grouping. First, movies are divided into fixed-size groups to be stored in servers, e.g., 220. Let $\mathbb{L}$ be the group size (in seconds). In order to accommodate a group in any server, clearly group size $\mathbb{L}$ must be chosen such that $$\mathbb{L} \leq \min_{v \in V} B_v. \quad (20)$$

Figure 6:
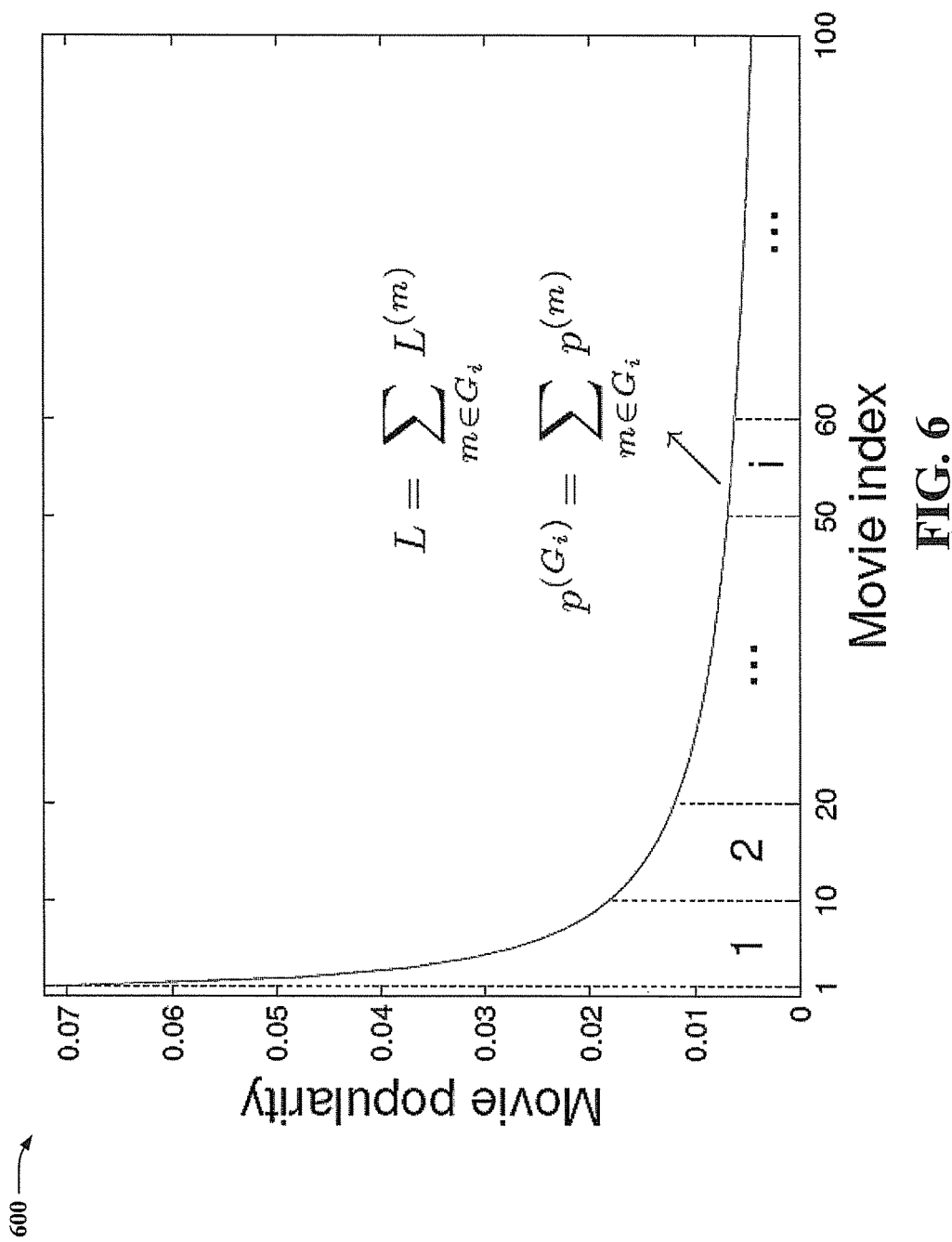
FIG. 6 illustrates a movie grouping scheme, in accordance with various embodiments.

As illustrated by FIG. 6, movies are grouped according to their decreasing popularity. The most popular movies are put into the $1^{st}$ group to make up the size $\mathbb{L}$, fragmenting the last movie and storing it across groups if necessary. The remaining movies are then assigned to group 2, 3, and so on. This process is repeated until the all the movies are grouped.

Let $\mathbb{G}$ be the set of groups and $G_i$ be the $i^{th}$ group. the above grouping process leads to the following:

• Length: Each group is of equal size $\mathbb{L}$ and satisfies (21)

$$\mathbb{L} = \sum_{m \in G_i} L^{(m)}, \forall G_i \in \mathbb{G}.$$

• Group popularity: The group popularity $p^{(G_i)}$ is given by (22)

$$p^{(G_i)} = \sum_{m \in G_i} p^{(m)}, \forall G_i \in \mathbb{G}.$$

Note that if a movie is fragmented across groups, the popularity of the movie in a group is proportionally adjusted based on its fragment length in the group.

After this movie grouping is done, LP-SR is run on the groups by treating them as |G|"movies" with popularity $p^{(G_i)}$. In the phase of segment storage, a group is partitioned into k group-segments and stored and accessed accordingly similar as before. The movie can be efficiently retrieved from a group-segment with a simple table lookup.

Figure 5:
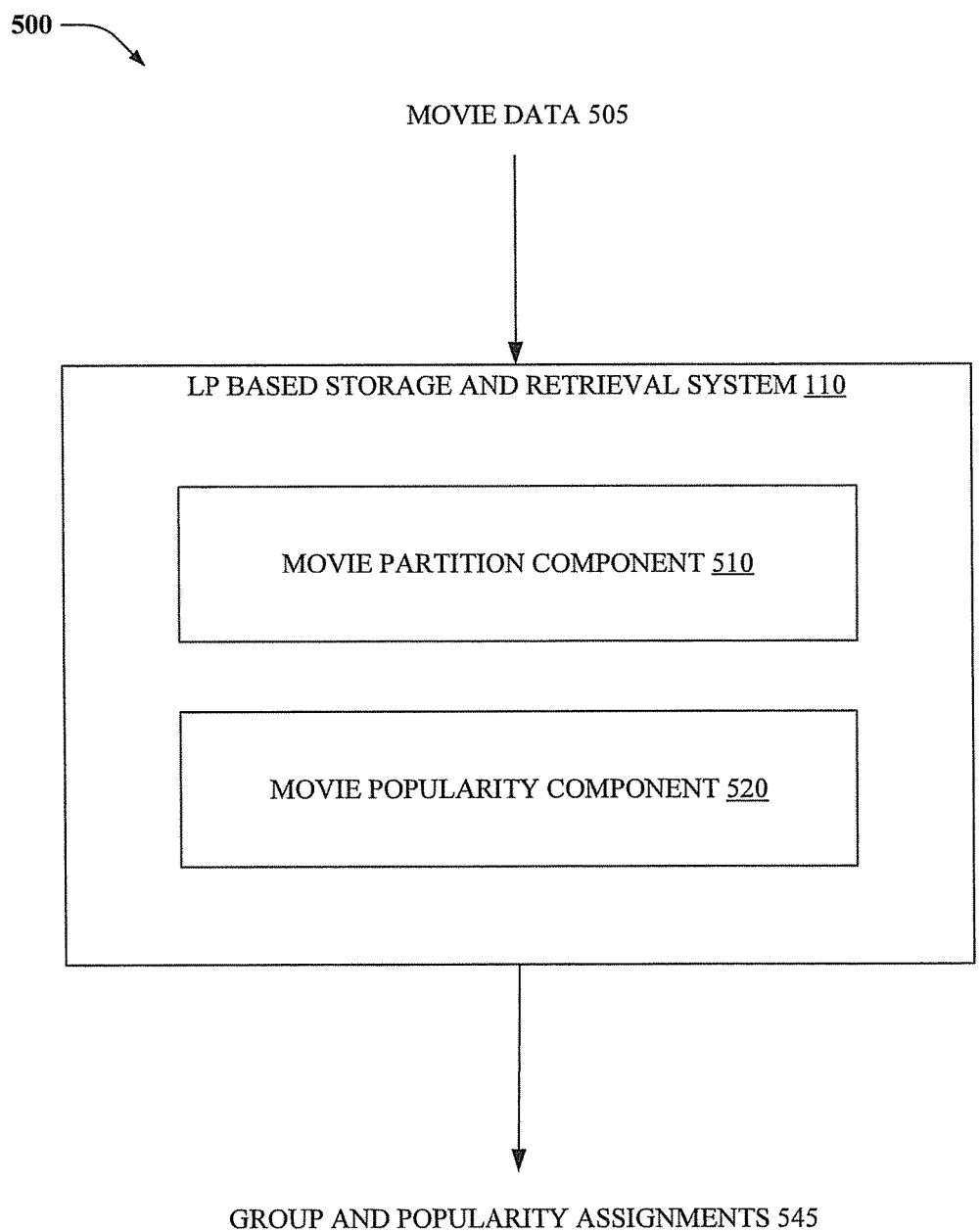
FIG. 5 illustrates a block diagram of another LP based storage and retrieval system, in accordance with various embodiments.

Now referring to FIGS. 5 and 6, and referencing Equations 20 to 22 above, a block diagram 500 of LP based storage and retrieval system 110, and illustration of an associated movie grouping scheme 600, are illustrated, in accordance with various embodiments. LP based storage and retrieval system 110 can include movie partition component 510 and movie popularity component 520, which can receive movie data 505 and generate group and popularity assignments 545 accordingly. In one embodiment, movie partition component 510 can divide movies, e.g., movie data 505, multimedia data, etc. into groups of a defined size. Further, movie partition component 510 can assign a movie of the movies to a group of the groups based on a defined popularity of the movie. Furthermore, movie popularity component 520 can modify the defined popularity of the movie, in the group, in proportion to a determined length of a portion, e.g., segment(s), etc. of the movie that has been assigned to the group. In another embodiment, LP based storage and retrieval system 110 can retrieve a movie from a group-segment utilizing lookup table, data store, etc. that references segments of a group corresponding to the movie.

III. Illustrative Simulation Results

In this section, we first present our simulation environment and performance metrics to study the performance of LP-SR, followed by illustrative results at steady state.

III.A Setup and Performance Metrics

Unless otherwise stated, the default values as shown in Table 3 below have been used for system parameters, e.g., the baseline case, for simulation.

TABLE 3

Baseline parameters used in our study.

| Parameter | Default value |
|---|---|
| k | 5 |
| Number of proxy servers | 10 |
| Number of movies | 100 |
| Average server storage | 10 movies |
| Zipf parameter (Skewness) of server storage | 0.4 |
| Average proxy server bandwidth | 160 Mbits/s |

TABLE 3-continued

Baseline parameters used in our study.

| Parameter | Default value |
| --- | --- |
| capacity | |
| Zipf parameter (Skewness) of server bandwidth | 0 (i.e., same bandwidth) |
| Zipf parameter (Skewness) of movie popularity | 0.6 |
| Movie length | 90 minutes |
| Average movie holding time | Movie length (i.e., $\alpha^{(m)} = 1$) |
| Movie streaming rate | 1 Mbits/s |
| Total request rate in the network | 0.3 req./s (equally distributed to the proxies) |
| $c_{uv}$ between central and proxy server | 0.01 unit/s |
| $c_{uv}$ between proxies | Zipf with parameter 0.6 and mean 0.005 unit/s |

Figure 7:
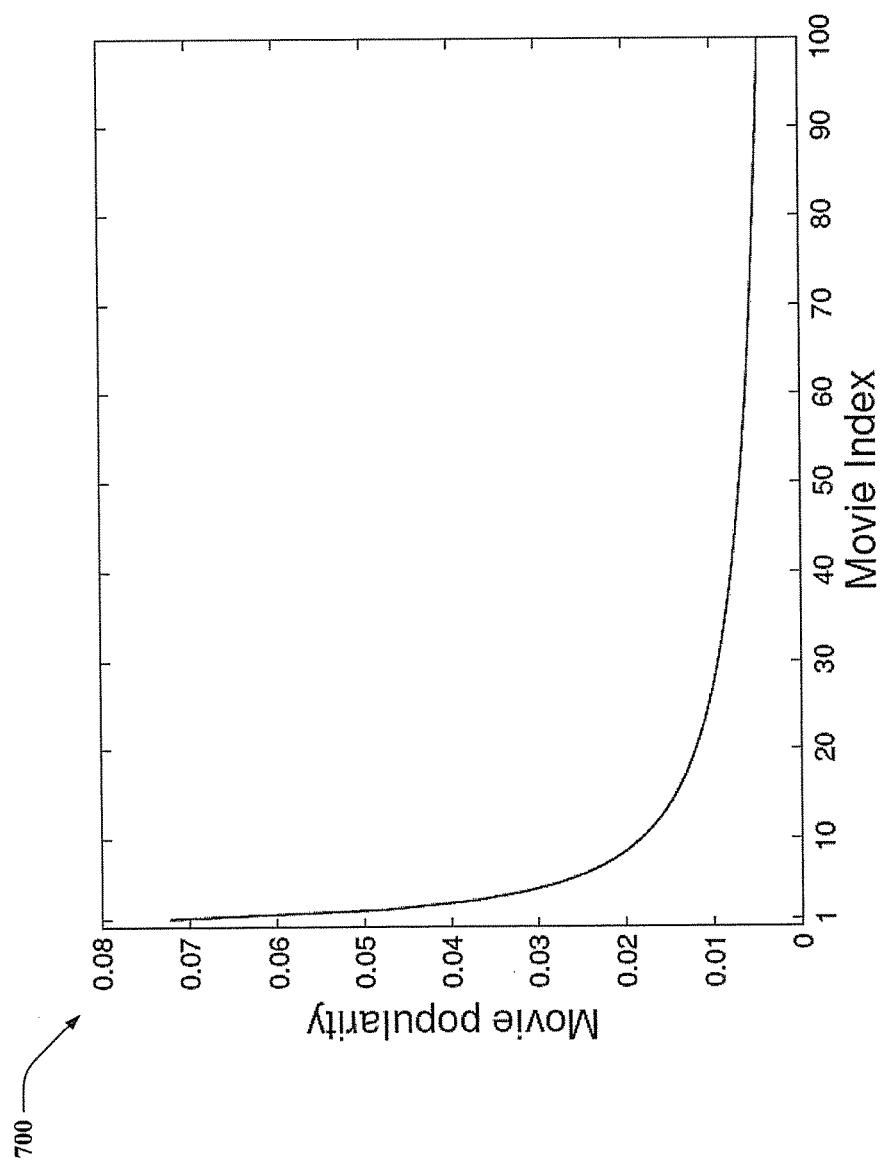
FIGS. 7-21 illustrate various simulation results associated with one or more LP based storage and retrieval infrastructures, in accordance with various embodiments.

Utilizing LP-SR can be applied to any movie popularity. For concreteness in our simulation, we consider that movie popularity follows the Zipf distribution with parameter s, i.e., the request probability of the i th movie is proportional to $1/i^s$. Now referring to FIG. 7, movie popularity given our baseline parameters of s=0.6 and m=100 movies, or Zipf paramter 0.6 for 100 movies, is illustrated, in accordance with various embodiments. As illustrated by FIG. 7, the top 30% of the movies account for close to 60% (56.72%) of the traffic. In a Zipf distribution, movie popularity becomes more "skewed" as s increases; therefore Zipf parameter s can be considered as the "skewness" of the distribution.

In our simulation, we consider that requests arrive at each proxy server according to a Poisson process with total rate λ (req./second). As described in the previous section, the optimization of LP-SR does not depend on the specific request process at server v but its arrival rate $\lambda_v$. Therefore, the results and conclusions may be extended to any request processes or traces so long as they share the same request rate.

Simulation assumptions include the following: the central server has no home users; the proxy servers have heterogeneous storage space and bandwidth following a Zipf distribution (independent of each other); and the repository stores all the movies with a streaming capacity twice of the average streaming capacity of the proxy servers.

In the simulation, we consider the network cost function from server u to server v to be proportional to the bandwidth between them, i.e., $$C_{uv}^N(\Gamma_{uv}) = c_{uv}\Gamma_{uv}, \forall u,v \in V, \quad (23)$$

where $c_{uv}$ is some constant (by definition, $c_{uv}=0$).

The server cost is a function of its storage and its total upload bandwidth used to serve the remote servers, modeled as $$C_v^S = \sigma_B B_v + C_v(R_v), \forall v \in V, \quad (24)$$

where $\sigma_B$ is a constant ($\sigma_B=10^{-5}$ in our baseline, and $C_v(R_v)$ is a piece-wise linear function monotonically increasing in $R_v$.

Figure 8:
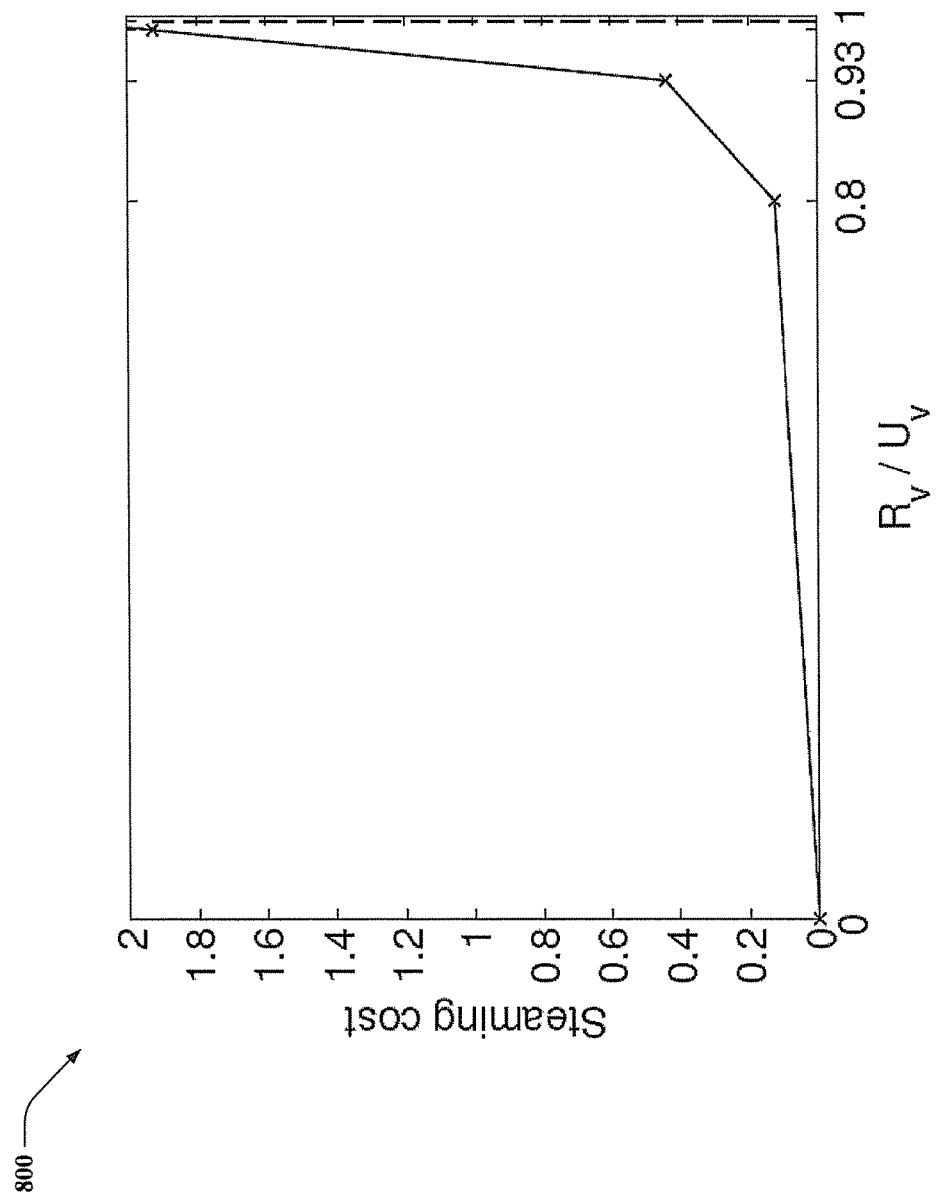

As $C_v(R_v)$ is limited by the bandwidth capacity of the server, we use a cost model inspired by queuing theory due to server congestion. FIG. 8 illustrates streaming cost $C_v(R_v)$ versus $R_v/U_v$ used in our simulation, where $U_v$ is the maximum uploading capacity of the server and hence $R_v/U_v$ is the bandwidth utilization of the server. The cost increases with the bandwidth utilization at the server. There are three linear segments formed by points (0,0), (0.8,0.125), (0.93,0.4375) and (0.99,1.925) (these coordinates can be easily verified using the queuing delay model $\sigma_S/(U_v-R_v)$, where $\sigma_S$ is some constant). As the consumed bandwidth $R_v$ approaches the bandwidth capacity $U_v$, the server cost increases sharply. (Note that although for concreteness we have used a cost model of a queuing function, LP-SR is by no means limited to that; any other monotonic cost function may be equally used.)

Performance metrics we are interested include the following:

Total cost (unit/s), which is the sum of server cost and network cost according to Equation (12). This is the total deployment cost of the network.

Server cost (unit/s), which is the sum of its storage and streaming defined in Equation (11) and Equation (24). We further examine the following cost components: Storage cost, which is the total cost due to server storage; and Streaming cost, which is the server bandwidth cost to support other servers.

Network cost (unit/s), which is network transmission cost defined by Equation (8) and Equation (23).

Cost of each movie (unit/s), which is the average cost to access movie m by any user. It is the cost to provide on-demand streaming service of the movie to users, due to its use of network bandwidth, server storage and server uploading bandwidth.

We compare LP-SR with the following traditional and state-of-the-art movie replication schemes:

Random, where each server randomly stores movies without considering their popularity. This is a simple storage strategy.

MPF (Most Popular First), where each server stores the most popular movies. This is a greedy strategy, but does not take advantage of cooperative replication.

Local Greedy, which divides the movies into three categories, those popular ones which all servers store (full replication), those medium popular ones which only one proxy server store (single copy), and those unpopular ones which only the repository stores (no copy). By formulating a LP problem, it seeks to minimize network cost. As Local Greedy assumes homogeneous access cost, we set its access cost to be equal to the average access cost between servers in our network.

Super-optimum, which is an LP solution that relaxes the integral constraints from Equation (1) to Equation (13) of JOSR. Due to such relaxation on $I_v^{(m)}$, its solution of minimum cost, denoted as $C^{LP*}$, must be lower than that of the original NP-hard solution denoted as $C^{NP*}$. In other words, $C^{LP*} \leq C^{NP*}$. We call $C^{LP*}$ the super-optimum solution because it is no worse than the NP-hard solution. Note that LP-SR solution must be no better than the NP-hard solution, i.e., $C^{NP*} \leq C^{LP-SR*}$. We will see later in the section that the LP-SR solution $C^{LP-SR*}$ is very close to and asymptotically approaches the super-optimum $C^{LP*}$, meaning that LP-SR is close to the NP-hard solution.

In the above comparison schemes, upon a miss request, the home server v chooses an available server u which has the requested content with a probability proportional to $1/c_{uv}$. It is a reasonable, simple and effective strategy because the server with lower access cost has higher chance to be chosen. With this probabilistic approach, a server with low access cost is not always selected so as to avoid congestion, and hence high network cost, at the server.

III.B Illustrative Results

Figure 9:
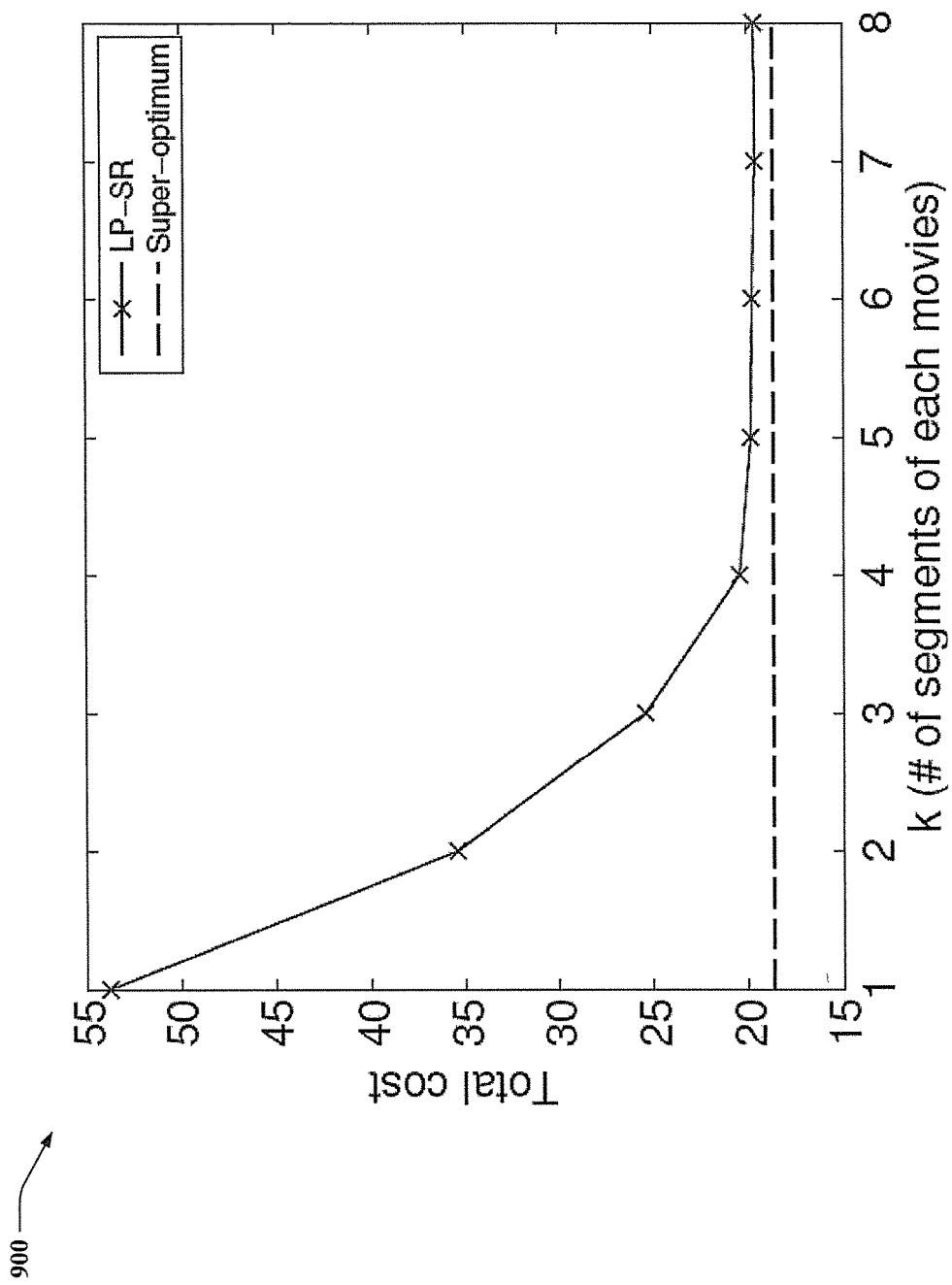

FIG. 9 illustrates the total cost versus k in LP-SR. As k increases, the network approaches the super-optimal case given by relaxing the integer constraints on movie storage $\{I_v^m\}$. (Note that the curve optimum lies between the LP-SR and the super-optimum.) However, for modest value of k, the performance is already very close to the optimum (less than 6.5% deviation in our default setting). This shows that our network is highly efficient, with closely optimal performance even for the practical finite value of k.

Figure 10:
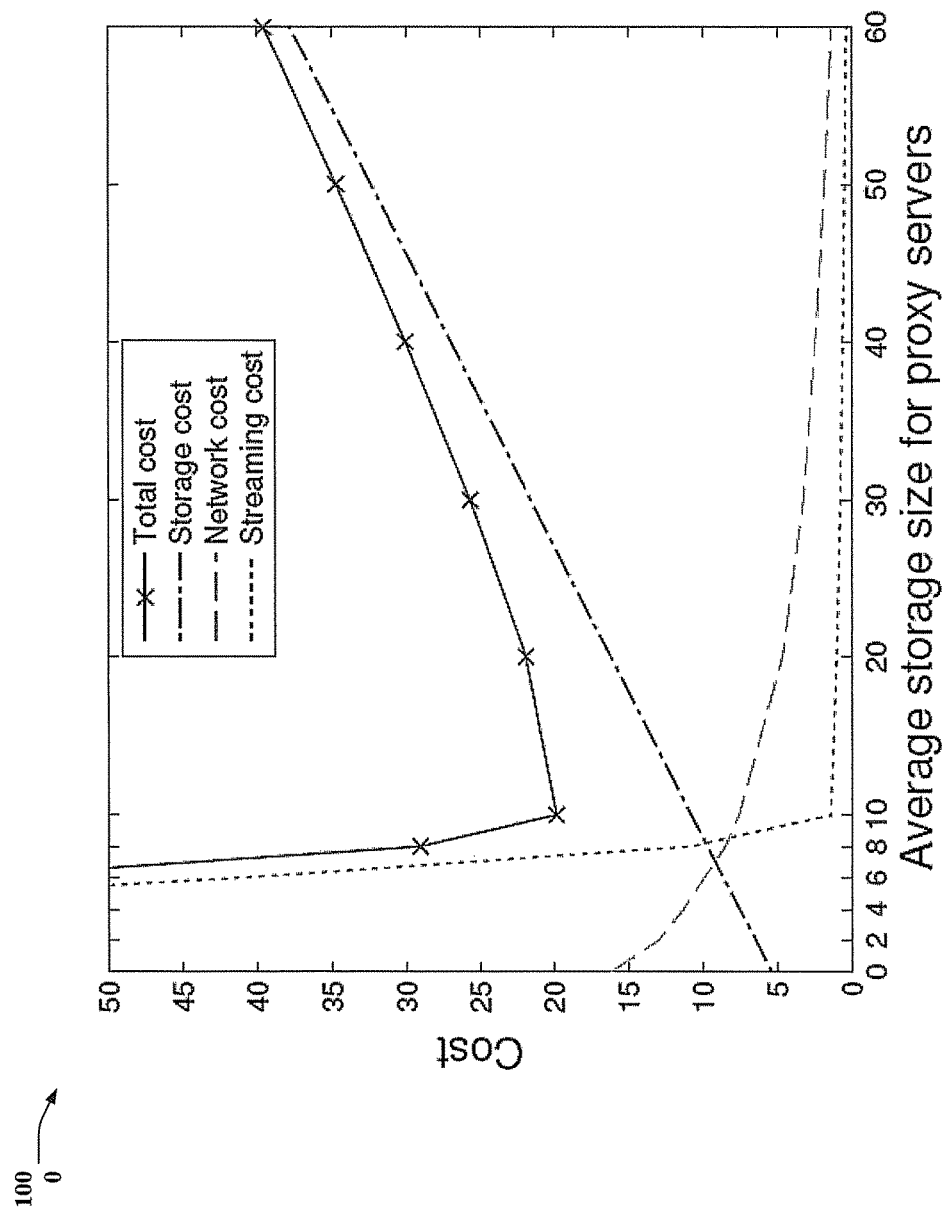

FIG. 10 illustrates cost, or cost components and total cost, versus the average storage space, or average proxy storage space, for servers. The total cost falls off initially but rises up again, showing a minimum. At the beginning when the proxy servers have little storage, all the traffic concentrates on the repository, leading to high overall streaming cost. As proxy storage increases, the repository load is reduced and hence the streaming and network transmission cost. As storage further increases, storage cost becomes a major component. It is clear that LP-SR can balance the cost between storage and bandwidth and achieve its optimality by provisioning optimal network resources.

Figure 11:
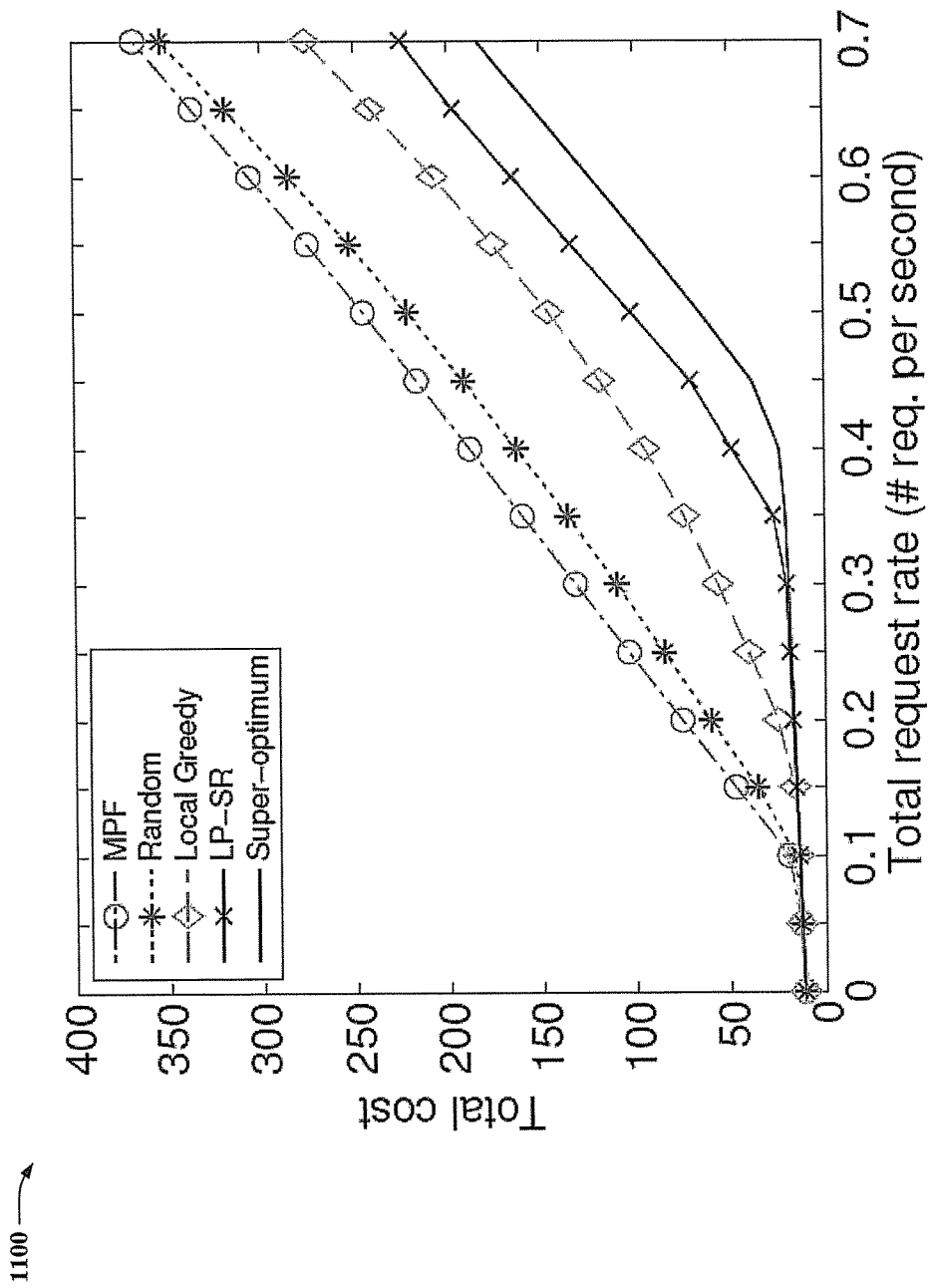

FIG. 11 illustrates the total cost versus the request rate given different schemes. Total cost grows with request rate mainly due to the increase in network traffic. LP-SR clearly achieves cost close to the optimum and much lower than any of the other schemes. In other words, given the same deployment budget, LP-SR can support much higher request rate (i.e., more concurrent users in the system). MPF does not perform well because it mainly relies on the central server to serve the requests for the unpopular movies. Random, due to its popularity-blind nature, stores insufficient copy of the popular movies, leading to considerable cost. Local Greedy has lower cost due to its network cost optimization. LP-SR achieves by far the best performance because it achieves near optimality by capturing not only the network transmission cost but also the server storage and streaming cost.

Figure 12:
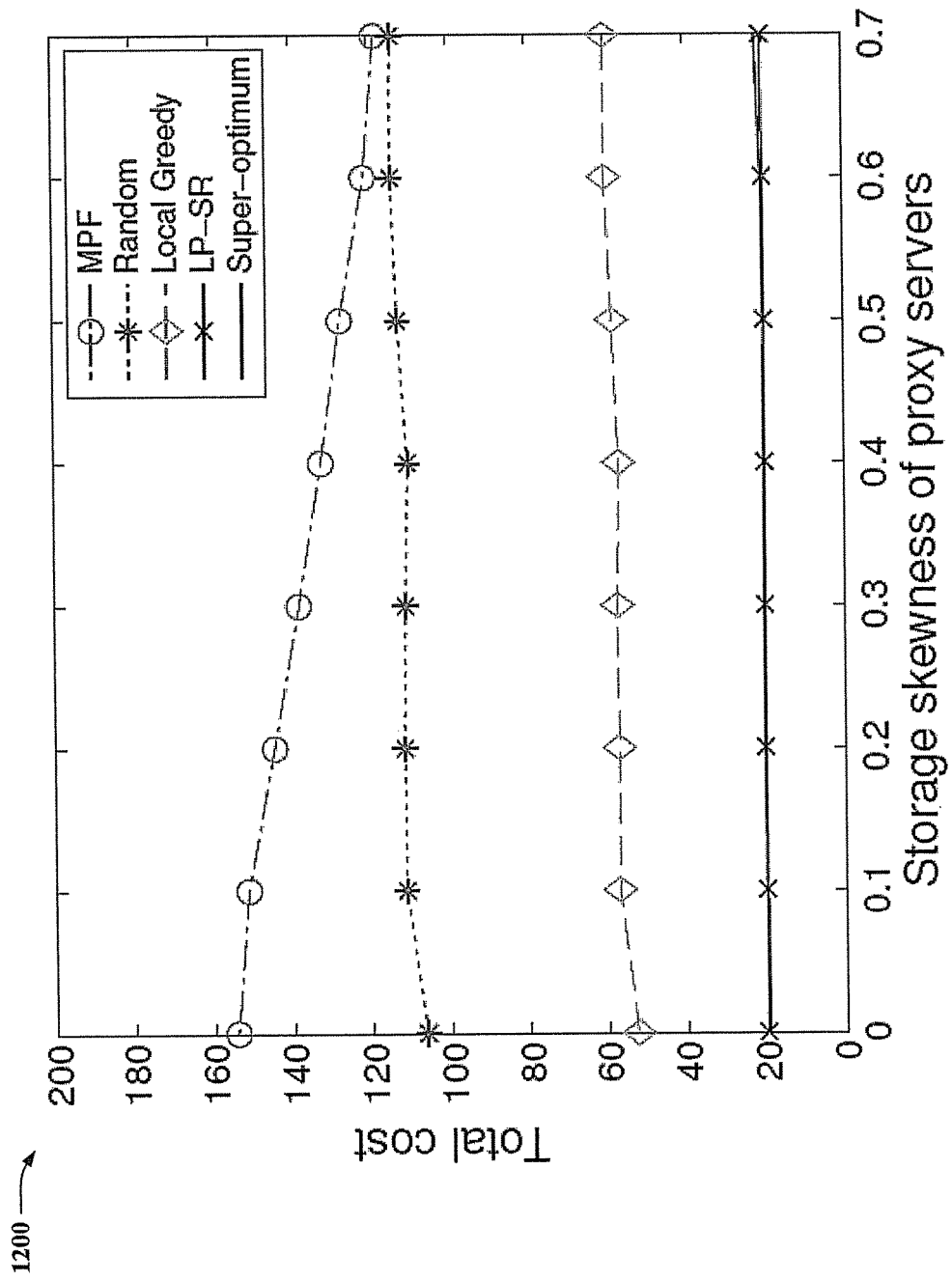

FIG. 12 illustrates the total cost versus the Zipf parameter (skewness) of the storage capacity of proxies given different schemes. The total cost in general increases with storage skewness. It is because skewed storage means that many requests have to be indirectly served by the remote servers of large storage space. This consumes much of server bandwidth, and hence the streaming cost dramatically increases. Having a substantially lower and closely-optimal cost with a much slower growth rate in cost, LP-SR is much more scalable and can make good movie placement by best utilizing server storage. MPF decreases with the Zipf parameter of storage because the proxies of large storage share some load from the repository, hence reducing the streaming cost of the repository.

Figure 13:
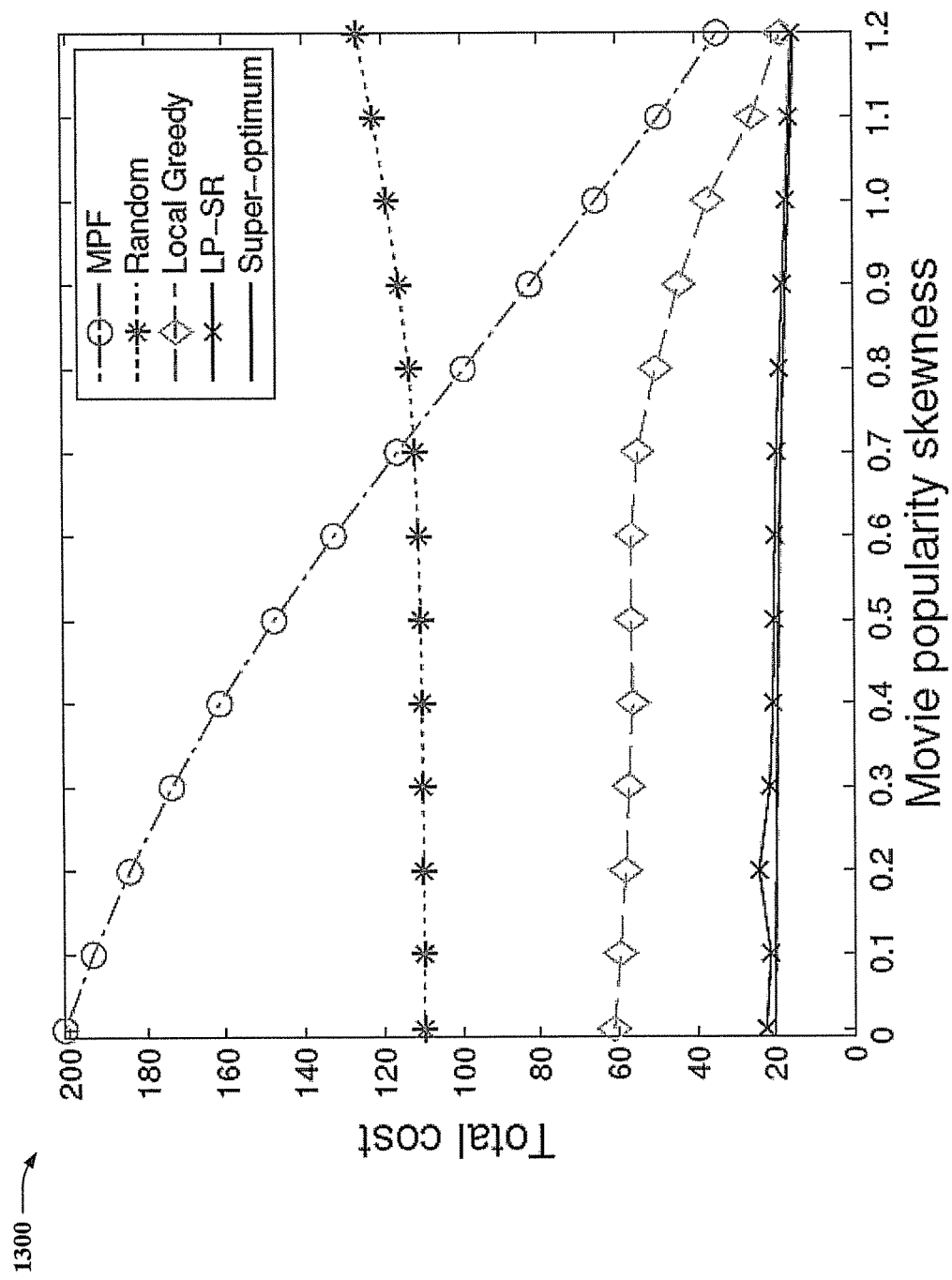

FIG. 13 illustrates total cost versus the Zipf parameter (skewness) of movie popularity given different schemes. The total cost in general decreases with the popularity skewness. This is because skewed popularity means that more requests are concentrated on fewer popular movies. Consequently, there is lower miss rate, leading to lower streaming and network cost. LP-SR achieves substantially the lowest cost (which is closely optimal with little difference), even for low Zipf parameter, i.e. when the popularity is quite uniform. This shows that LP-SR makes virtually optimal movie placement and retrieval decisions. Local Greedy performs better than MPF because it takes network cost into consideration. The cost of Random increases with Zipf parameter because it is popularity-blind. As a result, the popular movies, because of their copies not increasing with their popularity, suffer from high streaming and network cost.

Figure 14:
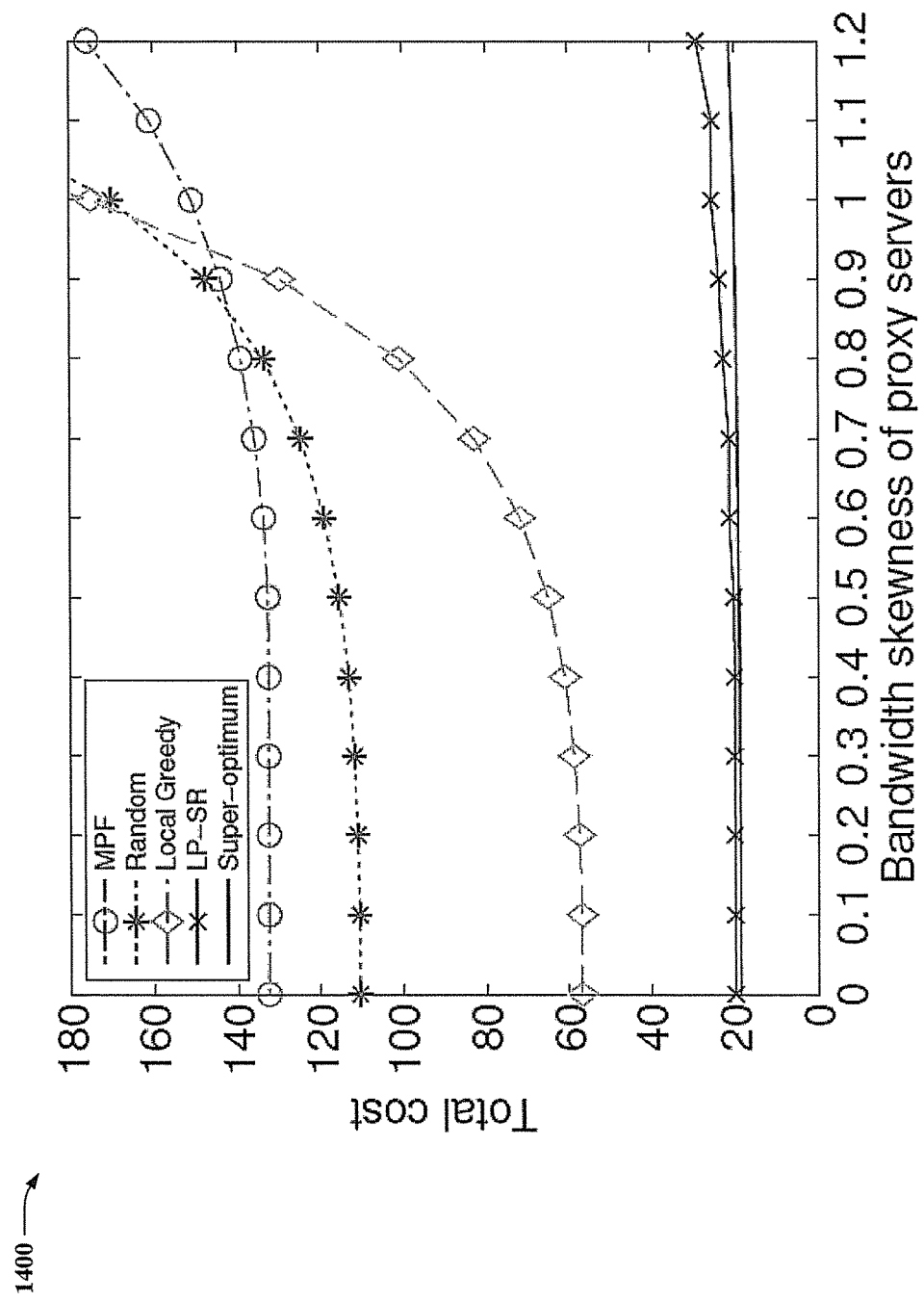

FIG. 14 illustrates total cost versus the Zipf parameter (skewness) of a proxy server bandwidth capacity given different schemes. In general, the total cost increases with the Zipf parameter because skewed bandwidth means that the servers with low bandwidth but large storage cannot support much remote streaming to other servers. This defeats the advantages on its locally stored movies. Furthermore, the servers with lower bandwidth more easily run out of bandwidth, leading to a sharp increase in streaming cost. LP-SR clearly has the lowest cost with little difference from the optimum, beating the other schemes by multiple times. It is also robust to system heterogeneity, and fully utilizes the storage and bandwidth resource for cooperative streaming.

Figure 15:
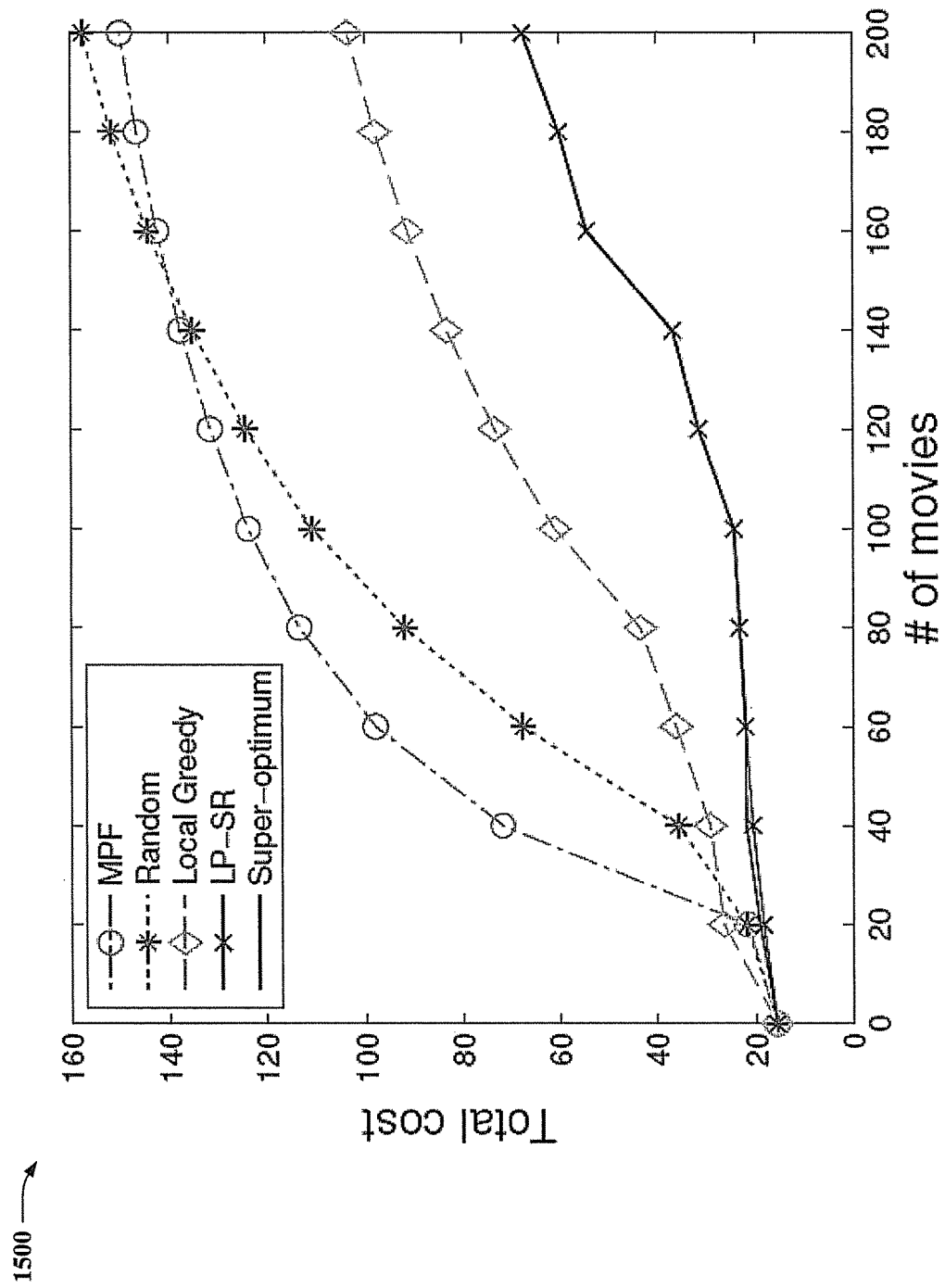

FIG. 15 illustrates total cost versus movie size given different schemes. The cost increases with the movie size because of additional network load to stream movies. LP-SR enjoys substantially the lowest cost as it makes closely optimal decisions on movie storage and retrieval. MPF suffers from high cost because the repository needs to stream those unpopular movies, leading to high streaming cost.

Figure 16:
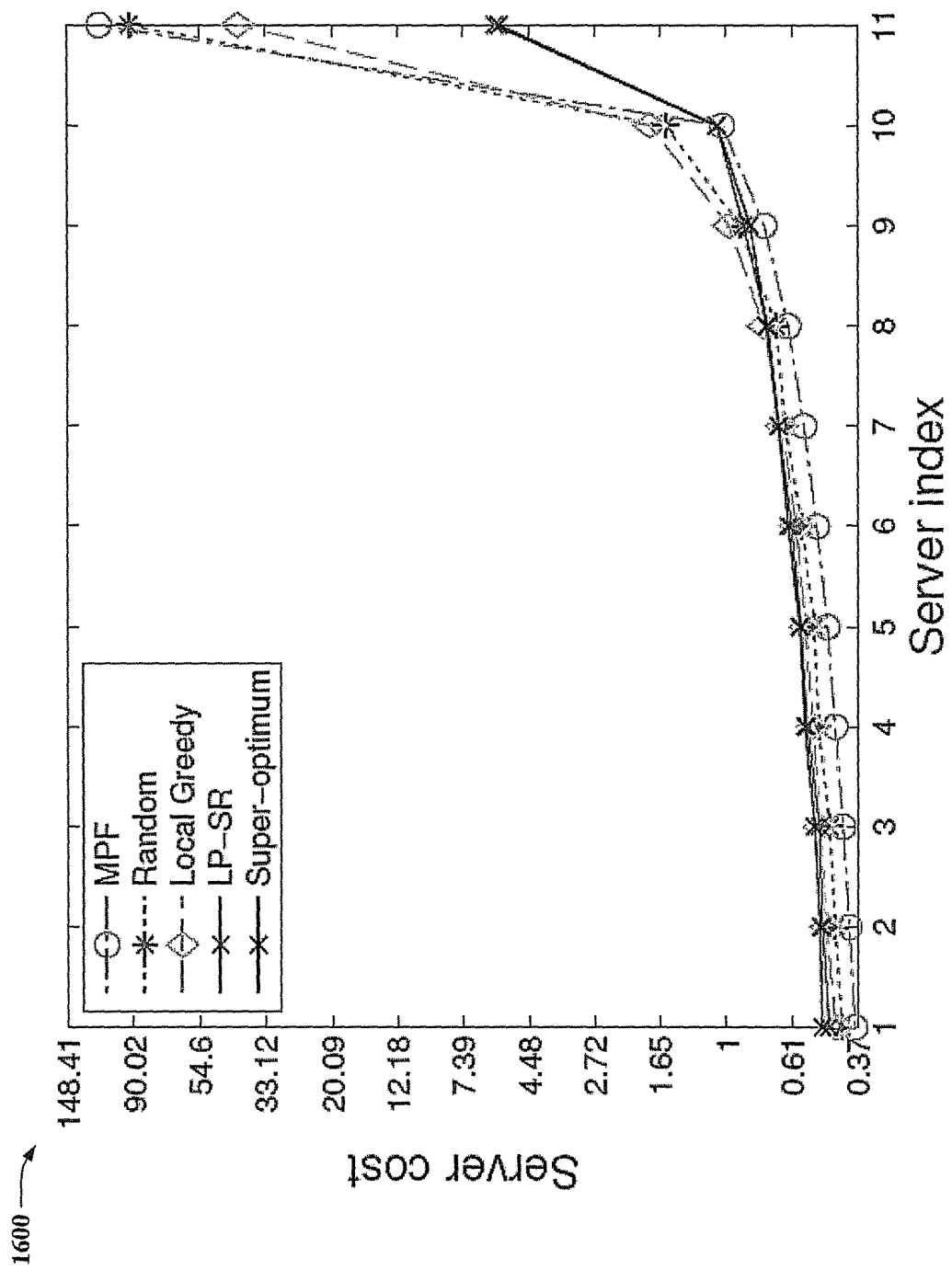

FIG. 16 illustrates server cost for different schemes. We sort the proxy servers according to their storage in ascending order (as their streaming capacity is the same in our baseline), and the last server is the repository. It is clear that LP-SR achieves costs of little difference from the optimum. Because of that, it utilizes the best storage and bandwidth resources of proxy servers, leading to the lowest repository streaming cost as compared with other schemes. All the other schemes suffer from high repository cost (noting the log scale) due to misses in the proxies. FIG. 16 illustrates that LP-SR has strong server cooperation to achieve near-optimal performance. As MPF only stores the most popular movies at the proxy servers, it has lower proxy server cost but much higher repository cost (due to traffic "misses"). In MPF, the proxies barely contribute their bandwidth and storage to help each other. Local Greedy, with network cost optimization, outperforms Random in both proxy server cost and repository cost.

Figure 17:
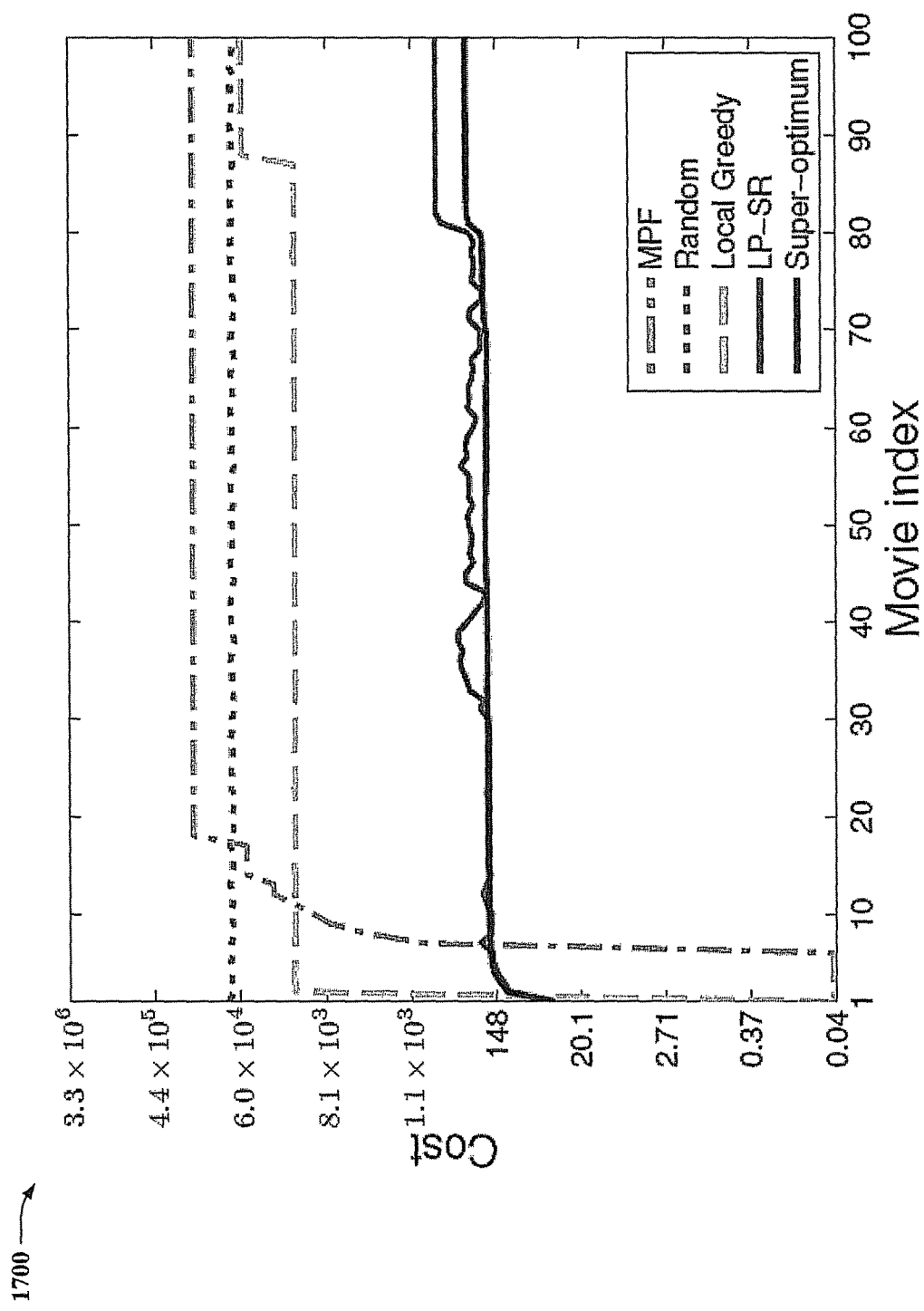

FIG. 17 illustrates the cost to access a movie for different schemes. The movies are sorted according to their descending popularity. The popularity-based schemes (i.e., LP-SR, Local Greedy and MPF) tend to locally store the popular movies, and hence those movies enjoy lower cost. LP-SR makes much better decision by cooperatively storing the movies. LP-SR accomplishes much better optimality with a rather uniform movie cost. Its cost of medium to unpopular movies is strikingly much lower by orders of magnitude than the other schemes. Also shown is the movie cost for the super-optimal case. LP-SR clearly achieves performance of little difference from the optimum. For MPF, the costs of popular movies are negligible at steep sacrifice of less popular ones. Random treats each movie equally and thus has the most uniform cost distribution. FIG. 17 illustrates that LP-SR makes intelligent decisions on movie storage and retrieval to achieve low deployment cost.

Figure 18:
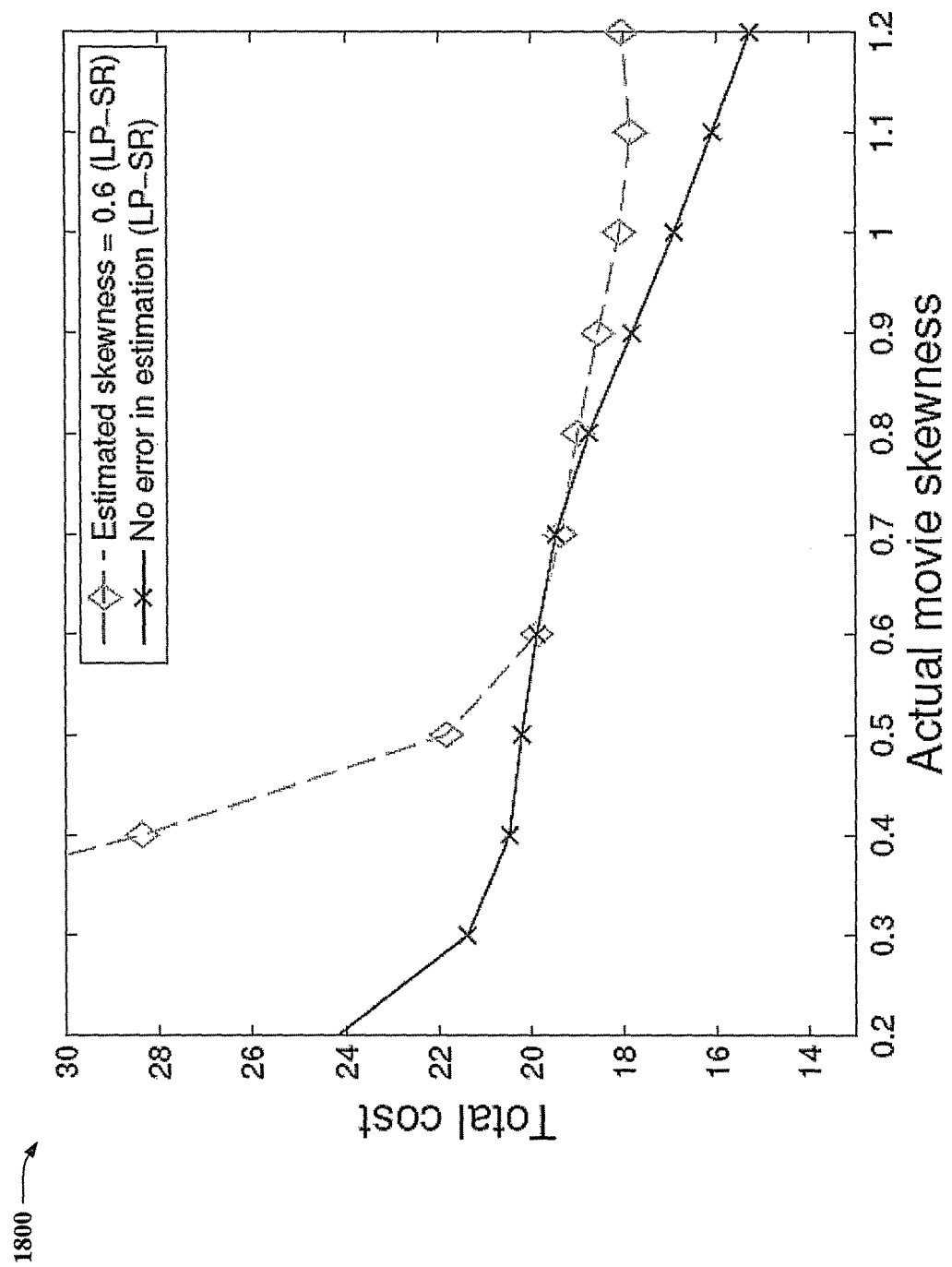

FIG. 18 illustrates system cost for different Zipf parameters, while movie ranks remain the same. We consider a system optimally designed with the Zipf parameter s=0.6, the estimated (or assumed) parameter for movie popularity. Also shown in solid line is the case if the assumed parameter exactly matches with the actual one. Obviously, at s=0.6, the two curves match. If the actual movie popularity is less skewed (lower s), the cost increases quite sharply because of the increase in access traffic. On the other hand, if the actual popularity is more skewed (higher s), the cost penalty due to such mis-estimation is not as high. This is because the servers storing those popular movies have lower miss rates. If the actual Zipf parameter further increases, the cost starts to increase again because those servers not storing those popular movies need to retrieve them from others, incurring much network and server bandwidth costs. The result shows that in estimating a Zipf parameter, over-estimation has higher impact than under-estimation (the performance is more sensitive to over-estimation). However, the estimation does not have to be very accurate in order to achieve closely optimal performance.

Figure 19:
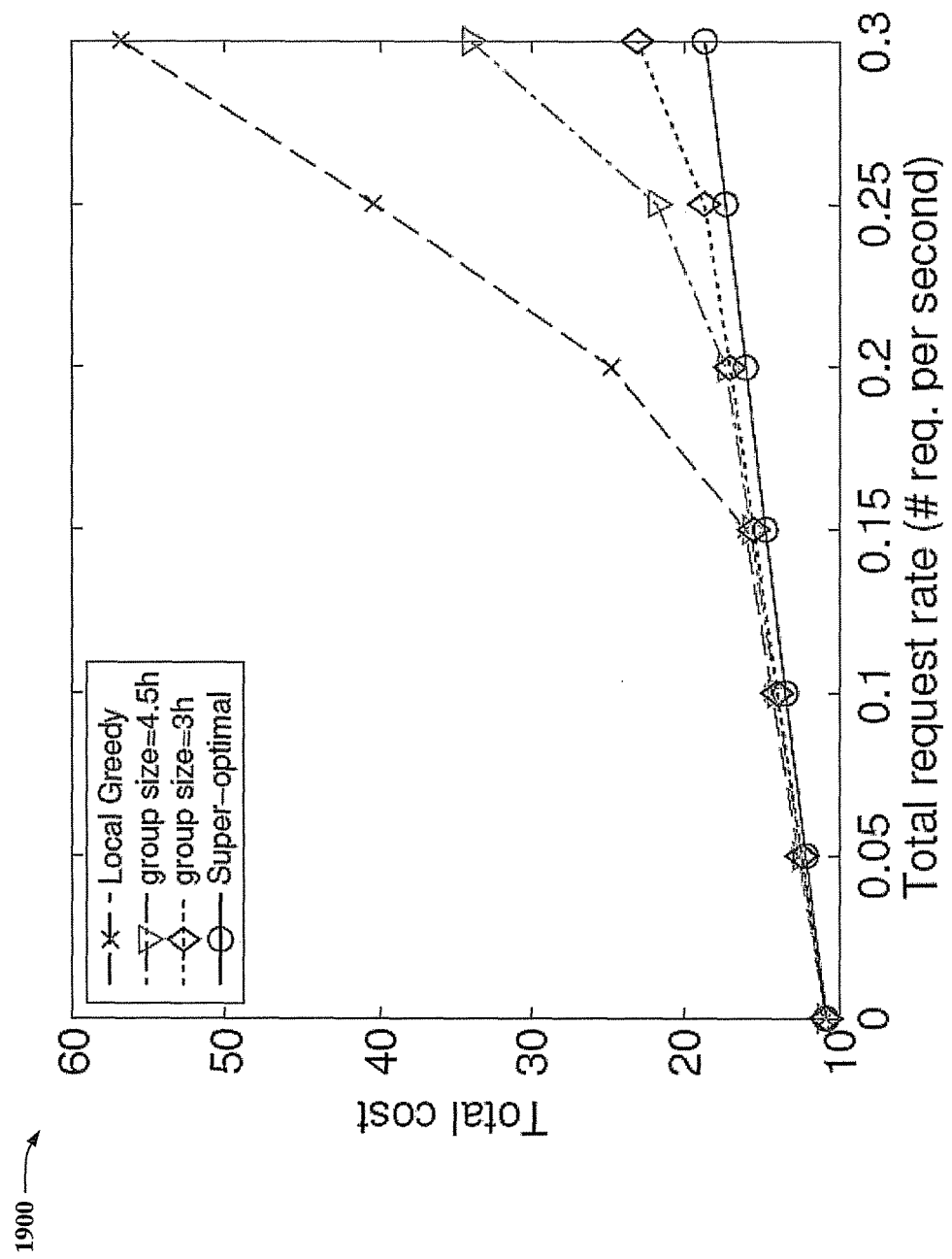
Figure 20:
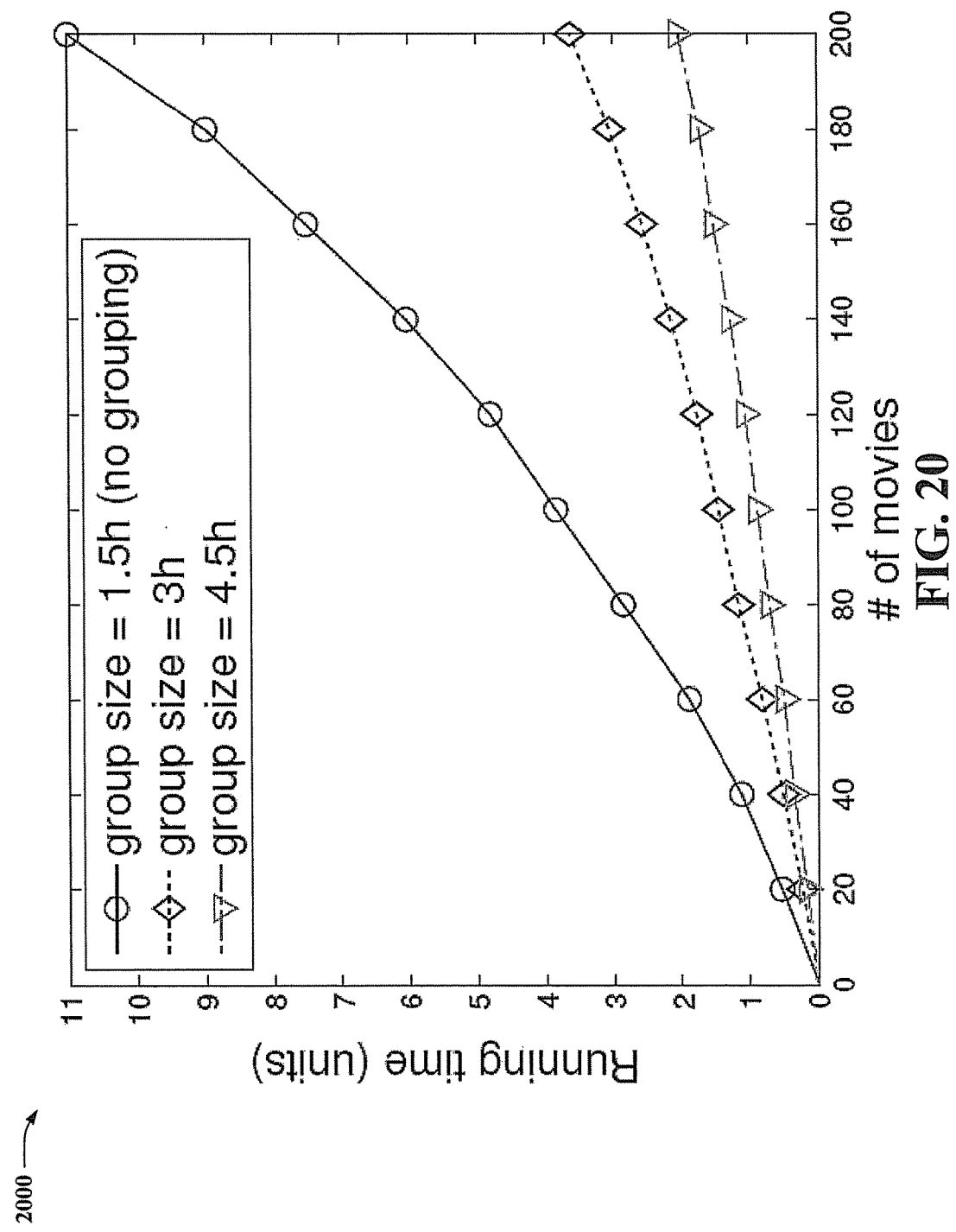
Figure 21:
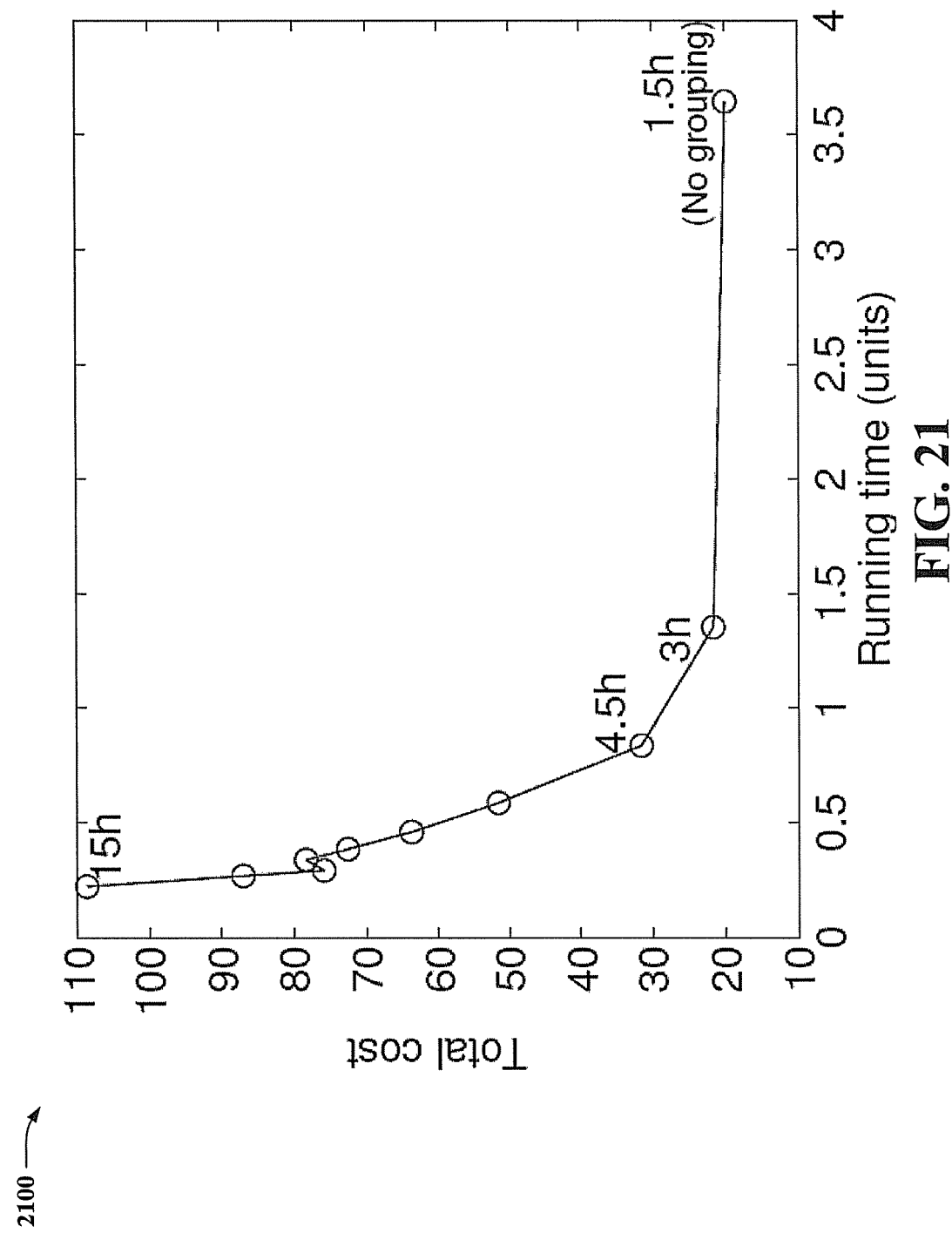

FIGS. 19 to 21 illustrate simulation results regarding the performance of our grouping algorithm utilizing the LP based storage and retrieval system 110 referenced in FIG. 5 above. We use the same baseline parameters as given above. Now referring to FIG. 19, total cost versus request rate given different group sizes, is illustrated, in accordance with various embodiments (because the default movie length is 90 minutes, a group size equal to that means no grouping). Total cost rises up with the request rate mainly because the increase of network load. Large group size can reduce the time complexity of LP-SR but increase the performance deviation from the optimum. LP-SR with movie grouping can still achieve closely optimum, outperforming Local Greedy by a wide margin (of multiple times when the request rate is high).

FIG. 20 illustrates total running (computational) time of LP-SR given different group sizes and in a no grouping case. As illustrated by FIG. 19, the running time increases with the total number of movies, e.g., since LP-SR captures the information for every movie, and hence more movies introduces more information and decision variables for LP-SR to process. LP-SR with movie grouping can greatly reduce the time complexity (over triple times in the default baseline setting). The result shows that movie grouping leads to efficient computation for a large movie pool.

FIG. 21 illustrates the tradeoff curve between total cost and running time for movie grouping. Also illustrates is the corresponding group size of each tradeoff point. As running time increases, LP-SR achieves better performance. Total cost first decreases sharply and then converges to some value (corresponding to the optimal value of no grouping). It is clear that a good operating point of the system is one with low running time and cost, which is around the "knee" of the around (with group size of 3 to 4.5 hours corresponding to 2 to 3 movies per group respectively).

Figure 22:
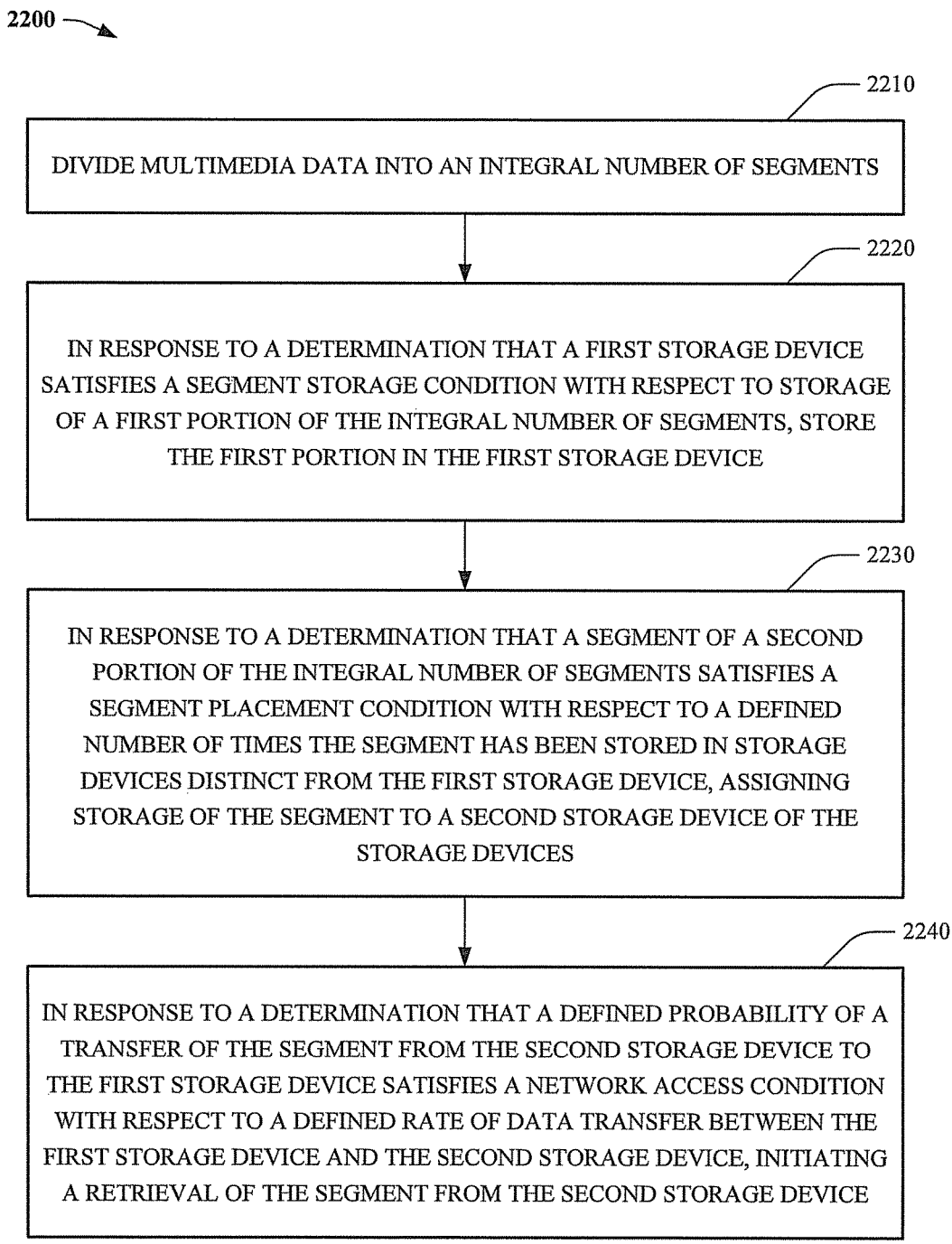
FIGS. 22-23 illustrate various processes associated with one or more LP based storage and retrieval infrastructures, in accordance with various embodiments.
Figure 23:
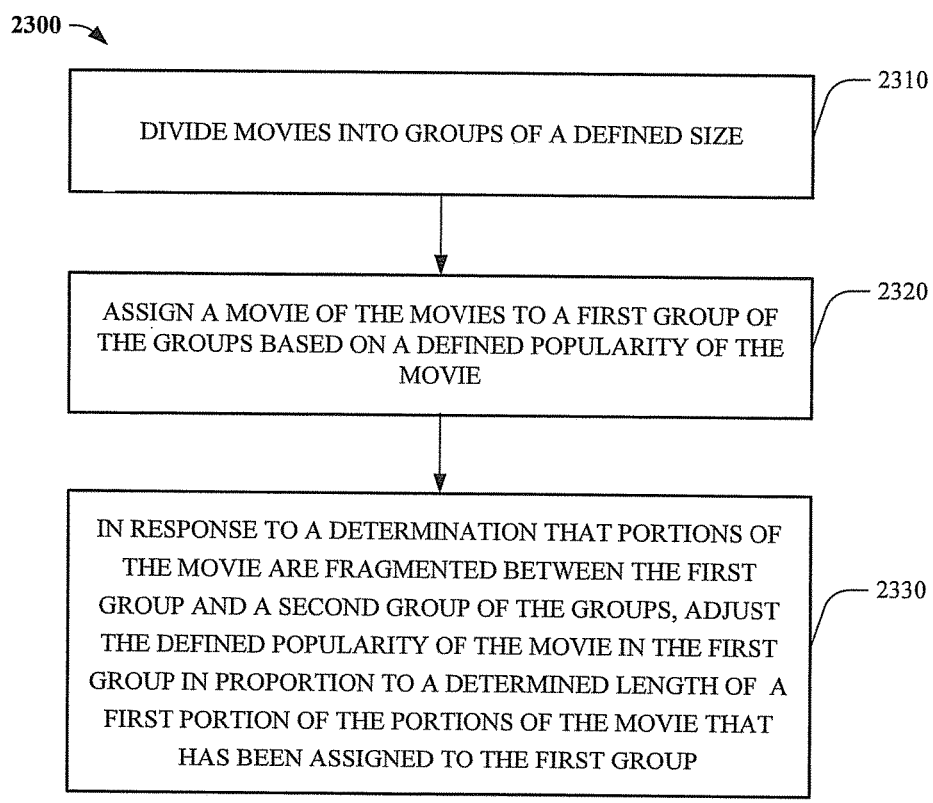

FIGS. 22-23 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 22, a process 2200 associated with an LP based storage and retrieval infrastructure, e.g., 100-500, etc. is illustrated, in accordance with various embodiments. At 2210, multimedia data, e.g., a movie, movie content, audio content, etc. can be divided, partitioned, etc. into an integral number of segments. At 2220, in response to a determination that a first storage device satisfies a segment storage condition with respect to storage of a first portion of the integral number of segments, the first portion can be stored in the first storage device. At 2230, in response to a determination that a segment of a second portion of the integral number of segments satisfies a segment placement condition with respect to a defined number of times the segment has been stored in storage devices distinct from the first storage device, storage of the segment can be assigned to a second storage device of the storage devices.

In one embodiment, the first portion can be stored in response to a determination that a storage size of the first storage device is greater than or equal to an amount of the storage of the first portion. In another embodiment, the first portion can be stored in the first storage device in response to a determination that a bandwidth associated with a defined transfer of segment(s) of the first portion from the first storage device to another storage device of the storage devices satisfies a defined condition with respect to a rate of data transfer between the first storage device and the other storage device.

At 2240, in response to a determination that a defined probability of a transfer of the segment from the second storage device to the first storage device satisfies a network access condition with respect to a defined rate of data transfer between the first storage device and the second storage device, a retrieval of the segment from the second storage device, e.g., via the first storage device, can be initiated, instructed, etc.

In one embodiment, the defined rate of data transfer can be based on a probability that a user device, client device, etc. requests access of the multimedia data, a rate of segment requests received by the first storage device, and/or an average amount of the multimedia data streamed from the second storage device to the first storage device.

FIG. 23 illustrates another process (2300) associated with an LP based storage and retrieval infrastructure, e.g., 100-500, etc., in accordance with various embodiments. At 2310, movies can be divided into groups of a defined size. At 2320, a movie of the movies can be assigned to a first group of the groups based on a defined popularity of the movie. At 2330, in response to a determination that portions of the movie are fragmented, stored, located, etc. between the first group and a second group of the groups, the defined popularity of the movie in the first group can be modified, adjusted, etc. in proportion to a determined length of a first portion of the portions of the movie that has been assigned to the first group.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantumdot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems, servers, etc. described above, non-volatile memory 2422 (see below), disk storage 2424 (see below), and memory storage 2446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 24:
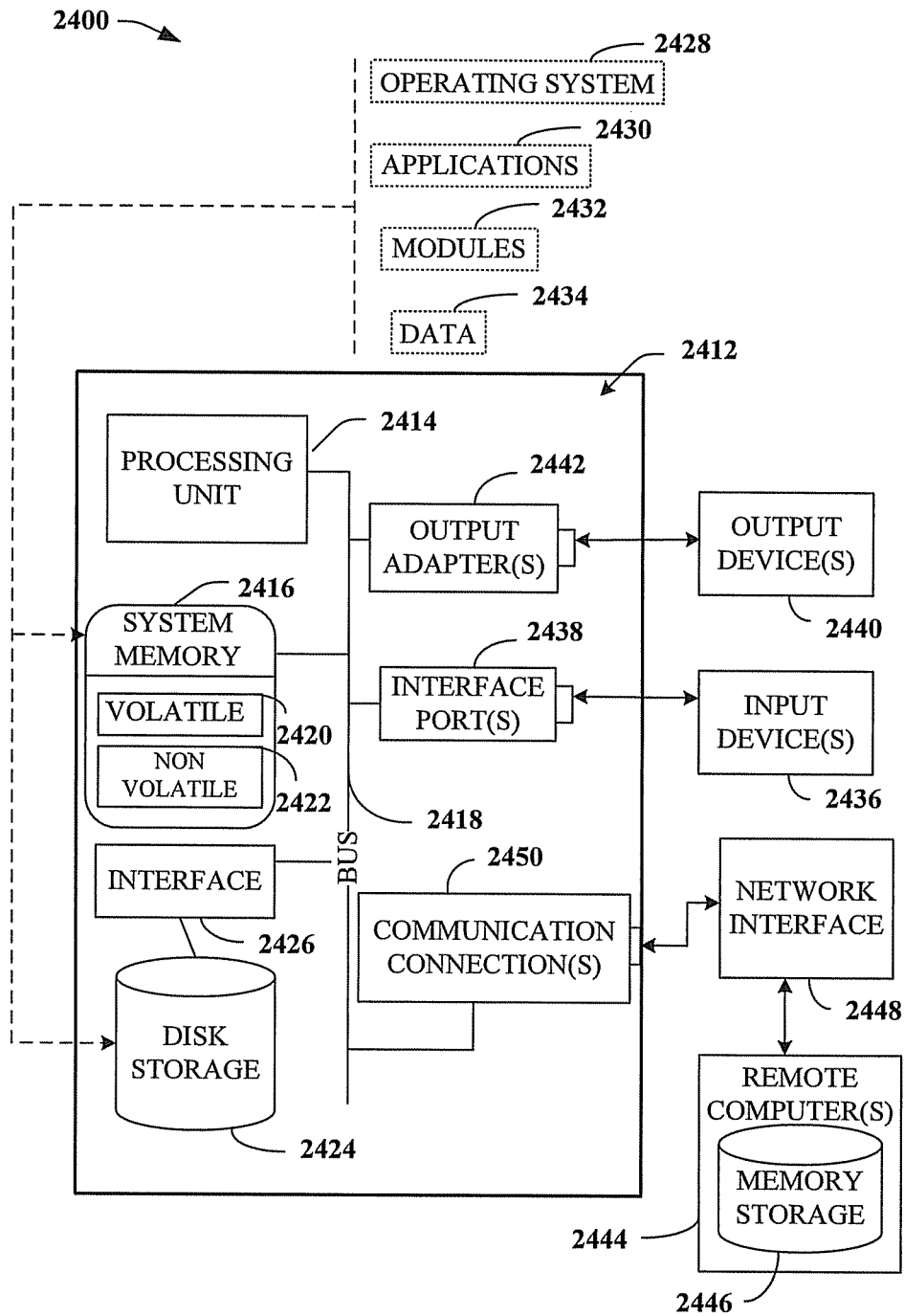
FIG. 24 illustrates a block diagram of a computing system operable to execute the disclosed systems and methods, in accordance with various embodiments.

In order to provide a context for the various aspects of the disclosed subject matter, FIG. 24, and the following discussion, are intended to provide a brief, general description of a suitable environment in which the various aspects of the disclosed subject matter can be implemented, e.g., various processes associated with FIGS. 1-23. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 24, a block diagram of a computing system 2400 operable to execute the disclosed systems and methods is illustrated, in accordance with an embodiment. Computer 2412 includes a processing unit 2414, a system memory 2416, and a system bus 2418. System bus 2418 couples system components including, but not limited to, system memory 2416 to processing unit 2414. Processing unit 2414 can be any of various available processors. Dual microprocessors and other multiprocessor architectures also can be employed as processing unit 2414.

System bus 2418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 2416 includes volatile memory 2420 and nonvolatile memory 2422. A basic input/output system (BIOS), containing routines to transfer information between elements within computer 2412, such as during start-up, can be stored in nonvolatile memory 2422. By way of illustration, and not limitation, nonvolatile memory 2422 can include ROM, PROM, EPROM, EEPROM, or flash memory. Volatile memory 2420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2412 can also include removable/non-removable, volatile/non-volatile computer storage media, networked attached storage (NAS), e.g., SAN storage, etc. FIG. 24 illustrates, for example, disk storage 2424. Disk storage 2424 includes, but is not limited to, devices like a magnetic disk drive, floppy disk drive, tape drive, Jaz drive, Zip drive, LS-110 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2424 to system bus 2418, a removable or non-removable interface is typically used, such as interface 2426.

It is to be appreciated that FIG. 24 describes software that acts as an intermediary between users and computer resources described in suitable operating environment 2400. Such software includes an operating system 2428. Operating system 2428, which can be stored on disk storage 2424, acts to control and allocate resources of computer 2412. System applications 2430 take advantage of the management of resources by operating system 2428 through program modules 2432 and program data 2434 stored either in system memory 2416 or on disk storage 2424. It is to be appreciated that the disclosed subject matter can be implemented with various operating systems or combinations of operating systems.

A user, client, etc. can enter commands or information into computer 2412 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2414 through system bus 2418 via interface port(s) 2438. Interface port(s) 2438 include, for example, a serial port, a parallel port, a game port, and a universal serial bus (USB). Output device(s) 2440 use some of the same type of ports as input device(s) 2436.

Thus, for example, a USB port can be used to provide input to computer 2412 and to output information from computer 2412 to an output device 2440. Output adapter 2442 is provided to illustrate that there are some output devices 2440 like monitors, speakers, and printers, among other output devices 2440, which use special adapters. Output adapters 2442 include, by way of illustration and not limitation, video and sound cards that provide means of connection between output device 2440 and system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. Remote computer(s) 2444 can be a personal computer, a server, a router, a network PC, a workstation, a microprocessor based appliance, a peer device, or other common network node and the like, and typically includes many or all of the elements described relative to computer 2412.

For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2450 refer(s) to hardware/software employed to connect network interface 2448 to bus 2418. While communication connection 2450 is shown for illustrative clarity inside computer 2412, it can also be external to computer 2412. The hardware/software for connection to network interface 2448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor, and
a memory that stores executable instructions that, when executed by the processor, facilitate performance of operations, comprising:
partitioning multimedia data into an integral number of segments;
receiving server parameters for network storage devices representing storage costs, streaming costs, and network costs, wherein the storage costs have been determined based on a cost of server storage comprising a first network storage device of the network storage devices, wherein the streaming costs have been determined based on a data transfer rate between the first network storage device and a second network storage device of the network storage devices, and wherein the network costs have been determined based on an amount of traffic that has been determined to have been directed from the first network storage device to the second network storage device;
based on the storage costs and the streaming costs, storing, via discretization, the integral number of segments between the first network storage device and the second network storage device;
receiving, from a client device, a request to stream a portion of the multimedia data from the first network device; and
in response to determining that the portion has not been stored in the first network device, initiating, based on the streaming costs and the network costs with respect to an average viewing time of the integral number of segments, the second network device to stream the content from the second network device to the client device.

2. The system of claim 1, wherein the operations further comprise:
in response to determining that the storage size is greater than or equal to a number of the integral number of segments, storing the number of the integral number of segments in the first network storage device.

3. The system of claim 1, wherein the network costs correspond to a defined transfer of a portion of an amount of the integral number of segments from the first network storage device to the second network storage device.

4. The system of claim 1, wherein the storage costs correspond to a condition representing a segment of the integral number of segments that has been least stored among a first defined number of the network storage devices with respect to remaining segments of an amount of the integral number of segments that have been stored among a second defined number of the network storage devices.

5. The system of claim 1, wherein the operations further comprise:
in response to determining that a probability of a transfer of a segment of the integral number of segments from a first remote storage device of the network storage devices to a second remote storage device of the network storage devices satisfies a condition with respect to a defined transmission bandwidth between the second remote storage device and the first remote storage device, initiating a retrieval of the segment from the first remote storage device.

6. The system of claim 5, wherein the initiating the retrieval comprises initiating the retrieval of the segment via the second remote storage device.

7. The system of claim 5, wherein the defined transmission bandwidth is based on at least one of a probability that a user device requests access of the multimedia data, a rate of segment requests received by the second remote storage device, or an average amount of the multimedia data streamed from the first remote storage device to the second remote storage device.

8. The system of claim 1, wherein the operations further comprise:
dividing the multimedia data into groups of a defined size, wherein the multimedia data comprises movies; and
assigning a movie to a group of the groups based on a defined popularity of the movie.

9. The system of claim 8, wherein the operations further comprise:
in response to determining that portions of the movie are fragmented across the group and another group of the groups, modifying the defined popularity of the movie in proportion to a determined length of a first portion of the portions of the movie that has been assigned to the group.

10. A method, comprising:
dividing, by a system comprising a processor, multimedia data into an integral number of segments;
receiving, by the system, information representing a storage cost comprising a cost of storage of a first storage device, a streaming cost with respect to a data transfer bandwidth between the first storage device and a second storage device, and a network cost with respect to an access bandwidth that has been determined to have been consumed between the first storage device and the second storage device;
storing, by the system based on the storage cost and the streaming cost utilizing discretization, the integral number of segments among the first storage device and the second storage device;
receiving, by the system, a request directed to the first storage device for a portion of the multimedia data; and
in response to the portion being determined to be absent from the first storage device, initiating a transfer of the portion from the second storage device to a requesting device based on the streaming cost and an average viewing time of the integral number of segments associated with the network cost.

11. The method of claim 10, further comprising:
in response to determining that a determined storage size of the second storage device is greater than or equal to an amount of storage of a portion of the integral number of segments, storing, by the system, the portion in the second storage device.

12. The method of claim 10, further comprising:
in response to determining that a bandwidth associated with a defined transfer of one or more segments of a portion of the integral number of segments from the first storage device to the second storage device satisfies a defined condition with respect to a rate of data transfer between the first storage device and the second storage device, storing, by the system, the portion of the integral number of segments in the first storage device.

13. The method of claim 10, further comprising:
determining, by the system, that a segment of the integral number of segments has been least stored among storage devices comprising the first storage device and the second storage device with respect to other segments of the integral number of segments.

14. The method of claim 10, further comprising:
in response to determining that a defined probability of a transfer of a segment of the integral number of segments from the first storage device to the second storage device satisfies a network access condition with respect to a defined rate of data transfer between the first storage device and the second storage device, initiating, by the system, a retrieval of the segment from the first storage device.

15. The method of claim 14, wherein the initiating the retrieval comprises initiating the retrieval of the segment by the second storage device.

16. The method of claim 14, wherein the defined rate of data transfer is based on at least one of a probability that a user device requests access of the multimedia data, a rate of segment requests received by the second storage device, or an average amount of the multimedia data streamed from the first storage device to the second storage device.

17. The method of claim 10, further comprising:
dividing, by the system, the multimedia data into groups of a defined size, wherein the multimedia data comprises movies; and
assigning, by the system, a movie of the movies to a first group of the groups based on a defined popularity of the movie.

18. The method of claim 17, further comprising:
in response to determining that portions of the movie are fragmented between the first group and a second group of the groups, adjusting, by the system, the defined popularity of the movie in the first group in proportion to a determined length of a first portion of the portions of the movie that has been assigned to the first group.

19. A video on demand storage system, comprising:
a processor, and
a memory that stores executable instructions that, when executed by the processor, facilitate performance of operations, comprising:
dividing movies into an integral number of storage segments;
receiving storage cost information representing a cost of storage devices, streaming cost information with respect to a rate of data transfer between the storage devices, and network cost information with respect to an amount of data that has been determined to have been transferred between the storage devices;
storing, via discretization based on the storage cost information and the streaming cost information, the integral number of storage segments between the storage devices;
receiving a request to stream a movie of the movies to a receiving device; and
in response to determining, based on the request, that the movie has not been stored in a local network storage device of the storage devices, initiating a remote network storage device of the storage devices to stream the movie to the receiving device based on the streaming cost information and an average viewing time of the integral number of segments corresponding to the network cost information.

20. The video on demand storage system of claim 19, wherein the operations further comprise:
in response to determining that a bandwidth associated with a defined transfer of one or more segments of the integral number of storage segments from a first storage device of the respective storage devices to a second storage device of the respective storage devices satisfies a condition with respect to a rate of data transfer between the first storage device and the second storage device, storing a portion of the one or more segments in the first storage device.

21. The video on demand storage system of claim 19, wherein the operations further comprise:
determining that a storage segment of the integral number of storage segments has been least stored among the respective storage devices with respect to other storage segments of the integral number of storage segments.

22. The video on demand storage system of claim 19, wherein the operations further comprise:
in response to determining that a defined probability of a transfer of a storage segment of the integral number of storage segments from a first storage device of the respective storage devices to a second storage device of the respective storage devices satisfies a condition with respect to a defined rate of data transfer from the first storage device to the second storage device, initiating a retrieval of the storage segment from the first storage device.

23. The video on demand storage system of claim 22, wherein the initiating the retrieval comprises initiating the retrieval of the storage segment by the second storage device.

24. A non-transitory machine-readable storage medium, comprising executable instructions that, when executed by a processor, facilitate performance of operations, comprising:
partitioning multimedia data into an integral number of storage segments;
receiving information for respective network storage devices comprising storage costs corresponding to the respective network storage devices, streaming costs corresponding to available data transfer rates between the respective network storage devices, and network costs corresponding to an amount of data that has been determined to have been directed from a first network storage device of the respective network storage devices and a second network storage device of the respective network storage devices;
based on the storage costs and the streaming costs, storing, via discretization, the integral number of segments between the respective network storage devices; and
in response to determining, based on a request that has been directed to the first network storage device for streaming a portion of the multimedia data from the first network storage device to a requesting device, that the portion has not been stored on the first network storage device, initiating, based on the steaming costs and an average viewing time of the integral number of segments corresponding to the network costs, the second network storage device to stream the portion to the requesting device.

25. The non-transitory machine-readable storage medium of claim 24, wherein the operations further comprise:
in response to determining that a probability of a transfer of a storage segment of the integral number of storage segments from a remote proxy server device to a local proxy server device satisfies a condition with respect to a defined rate of data transfer between the local proxy server device and the remote proxy server device, initiating a retrieval of the storage segment from the remote proxy server device.

* * * * *